(12) United States Patent
Tang et al.

(10) Patent No.: US 12,456,229 B2
(45) Date of Patent: Oct. 28, 2025

(54) SYSTEMS AND METHODS FOR COMPRESSION OF THREE-DIMENSIONAL VOLUMETRIC REPRESENTATIONS

(71) Applicant: Google LLC, Mountain View, CA (US)

(72) Inventors: Danhang Tang, San Francisco, CA (US); Saurabh Singh, Mountain View, CA (US); Cem Keskin, San Francisco, CA (US); Phillip Andrew Chou, Bellevue, WA (US); Christian Haene, Berkeley, CA (US); Mingsong Dou, Cupertino, CA (US); Sean Ryan Francesco Fanello, San Francisco, CA (US); Jonathan Taylor, San Francisco, CA (US); Andrea Tagliasacchi, Toronto (CA); Philip Lindsley Davidson, Arlington, MA (US); Yinda Zhang, Dale City, CA (US); Onur Gonen Guleryuz, San Francisco, CA (US); Shahram Izadi, Tiburon, CA (US); Sofien Bouaziz, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 442 days.

(21) Appl. No.: 17/919,460

(22) PCT Filed: Apr. 17, 2020

(86) PCT No.: PCT/US2020/028689
§ 371 (c)(1),
(2) Date: Oct. 17, 2022

(87) PCT Pub. No.: WO2021/211133
PCT Pub. Date: Oct. 21, 2021

(65) Prior Publication Data
US 2023/0154051 A1    May 18, 2023

(51) Int. Cl.
*G06T 9/00* (2006.01)
*G06T 17/00* (2006.01)

(52) U.S. Cl.
CPC .............. *G06T 9/001* (2013.01); *G06T 9/002* (2013.01)

(58) Field of Classification Search
CPC ...... H04N 19/91; H04N 19/597; H04N 19/00; G06T 9/001; G06T 9/002; G06T 15/04; G06T 17/00; G06T 17/30
See application file for complete search history.

(56) References Cited

U.S. PATENT DOCUMENTS

| 8,884,953 B2 * | 11/2014 | Chen ...................... G06T 9/004 382/243 |
| 10,242,484 B1 * | 3/2019 | Cernigliaro ............. G06T 9/008 |

(Continued)

OTHER PUBLICATIONS

Tang, Danhang, et al. "Real-time compression and streaming of 4d performances." ACM Transactions on Graphics (TOG) 37.6 (2018): 1-11. (Year: 2019).*

(Continued)

*Primary Examiner* — Henok Shiferaw
*Assistant Examiner* — Toluwani Mary-Jane Ijaseun
(74) *Attorney, Agent, or Firm* — DORITY & MANNING P.A.

(57) ABSTRACT

Systems and methods are directed to encoding and/or decoding of the textures/geometry of a three-dimensional volumetric representation. An encoding computing system can obtain voxel blocks from a three-dimensional volumetric representation of an object. The encoding computing system can encode voxel blocks with a machine-learned voxel encoding model to obtain encoded voxel blocks. The encoding computing system can decode the encoded voxel blocks with a machine-learned voxel decoding model to obtain reconstructed voxel blocks. The encoding computing system (Continued)

can generate a reconstructed mesh representation of the object based at least in part on the one or more reconstructed voxel blocks. The encoding computing system can encode textures associated with the voxel blocks according to an encoding scheme and based at least in part on the reconstructed mesh representation of the object to obtain encoded textures.

21 Claims, 10 Drawing Sheets

(56) References Cited

U.S. PATENT DOCUMENTS

| | | | |
|---|---|---|---|
| 11,250,595 B2 | 2/2022 | Covell et al. | |
| 2017/0046868 A1* | 2/2017 | Chernov | G06T 7/246 |
| 2019/0287273 A1* | 9/2019 | Yokose | G06T 15/08 |

OTHER PUBLICATIONS

Guarda, André FR, Nuno MM Rodrigues, and Fernando Pereira. "Deep learning-based point cloud coding: A behavior and performance study." 2019 8th European Workshop on Visual Information Processing (EUVIP). IEEE, 2019. (Year: 2019).*

Tang, Danhang, et al. "Deep implicit volume compression." Proceedings of the IEEE/CVF conference on computer vision and pattern recognition. 2020. (Year: 2020).*

Liu, Zheng-Ning, et al. "High-quality textured 3D shape reconstruction with cascaded fully convolutional networks." IEEE Transactions on Visualization and Computer Graphics 27.1 (2019): 83-97. (Year: 2019).*

Chou, Philip A., et al. "Dynamic polygon clouds: Representation and compression for VR/AR." arXiv preprint arXiv:1610.00402 (2016). (Year: 2016).*

Chou et al., "A Volumetric Approach to Point Cloud Compression—Part I: Attribute Compression", Transactions on Image Processing, vol. 29, 2020, pp. 2203-2216.

International Preliminary Report of Patentability for PCT/US2020/028689, mailed on Oct. 27, 2022, 12 pages.

International Search Report and Written Opinion for PCT/US2020/028689, mailed on Jan. 14. 2021, 15 pages.

Guarda et al., "Deep Learning-Based Point Cloud Coding: A Behavior and Performance Study", European Workshop on Visual Information Processing, 2019, pp. 34-39.

Tang et al., "Real-time Compression and Streaming of 4D Performances", ACM Transactions on Graphics, vol. 37, No. 6, Nov. 2018, 11 pages.

Xiao et al., "A Survey on Deep Geometry Learning: From a Representation Perspective", arXiv:2002.07995v2, Apr. 15, 2020, 21 pages.

Machine Translated Chinese Search Report Corresponding to Application No. 202080099896.7 on Dec. 11, 2024.

* cited by examiner

SYSTEMS AND METHODS FOR COMPRESSION OF THREE-DIMENSIONAL VOLUMETRIC REPRESENTATIONS

PRIORITY CLAIM

This application is based upon and claims the right of priority under 35 U.S.C. § 371 to International Application No. PCT/US2020/028689 filed on Apr. 17, 2020, which is incorporated by reference herein.

FIELD

The present disclosure relates generally to compressing three-dimensional volumetric representations. More particularly, the present disclosure relates to utilizing machine-learned models and corresponding texture compression techniques to respectively compress the geometry and textures of three-dimensional volumetric representations.

BACKGROUND

Three-dimensional volumetric representations have been popular in three and four-dimensional reconstruction techniques. However, transmitting high quality three and four-dimensional sequences is still challenging due to their large memory footprints. As an example, the memory footprint associated with a compressing a mesh representation of a volume (e.g., an object, a person, etc.) is relatively high. If the data to be transmitted is four-dimensional (e.g., a series of three-dimensional frames, etc.), the memory footprint can be prohibitive to establishing quality transmission of the data.

BRIEF DESCRIPTION OF THE DRAWINGS

Detailed discussion of embodiments directed to one of ordinary skill in the art is set forth in the specification, which makes reference to the appended figures, in which.

Figure 1A:
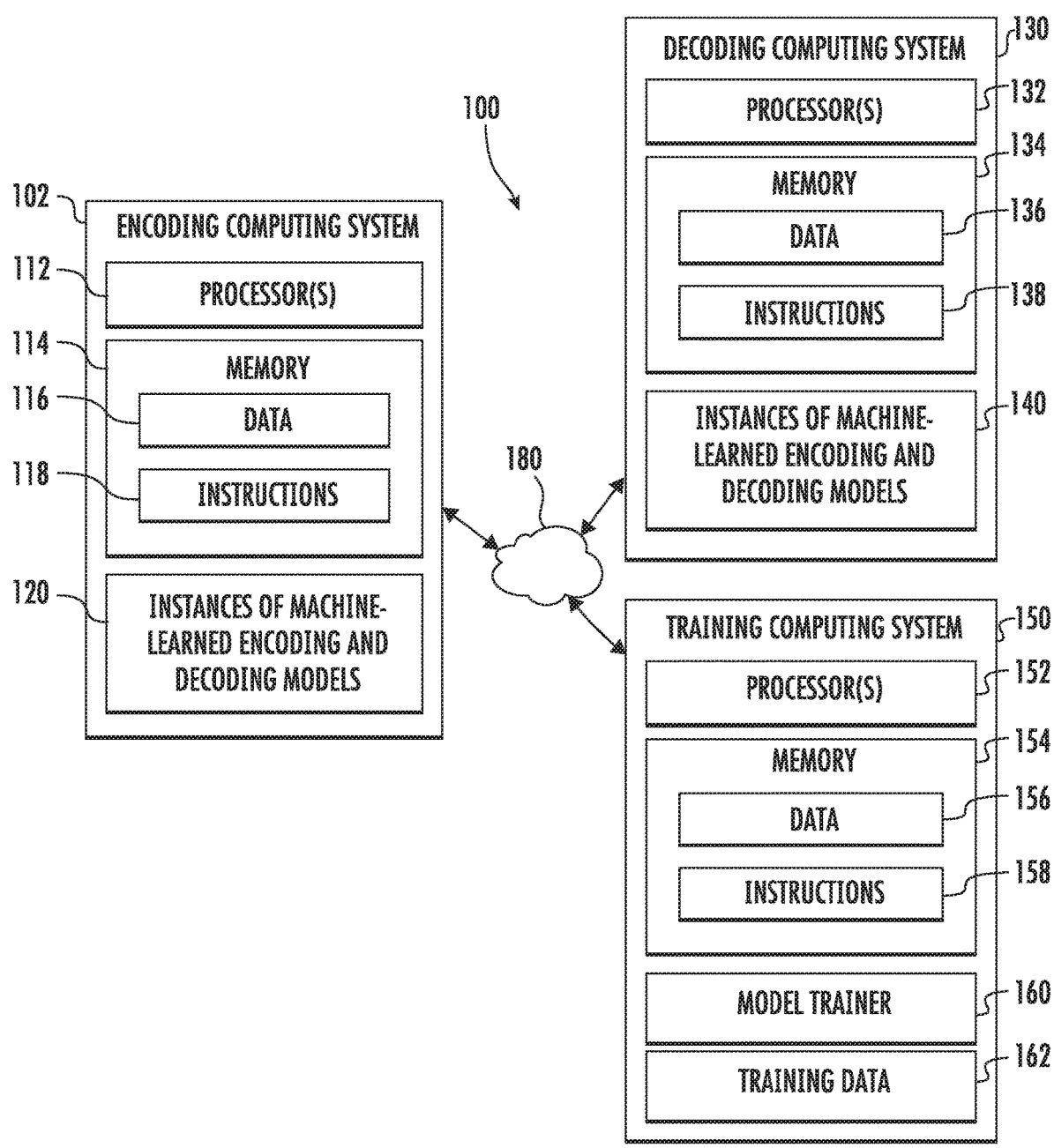
FIG. 1A depicts a block diagram of example computing systems that performs encoding and decoding of three-dimensional volumetric representations according to example embodiments of the present disclosure.

Reference numerals that are repeated across plural figures are intended to identify the same features in various implementations.

DETAILED DESCRIPTION

Overview

Generally, the present disclosure is directed to compressing three-dimensional volumetric representations using a compression pipeline. More specifically, machine-learned encoding and decoding models can be used to encode and decode the geometry (e.g., voxels containing truncated signed distance fields, etc.) of the volumetric representation in a lossy fashion while a texture atlas can be used to encode and store the textures associated with the volumetric representation in a lossless fashion. Subsets of the volumetric representation geometry (e.g., blocks of the voxels of the representation, etc.) can be selectively encoded to reduce the total amount of data for encoding (e.g., using a machine-learned voxel encoding model, etc.). The geometry and associated textures can be encoded at an encoding computing system and transmitted or otherwise provided to a decoding computing system which may be the same as or different from the encoding computing system. The decoding computing system can reconstruct the voxels of the geometry from the encoded voxel blocks (e.g., using a machine-learned voxel decoding model, etc.) and then extract a mesh representation of the volumetric representation from the reconstructed voxels with an extraction algorithm (e.g., a marching cubes algorithm, etc.). The decoding computing system can decode the encoded texture atlas and apply the decoded textures to the mesh representation to generate a reconstructed three-dimensional volumetric representation. In such fashion, the three-dimensional volumetric representation can be efficiently compressed at a sending computing system and be subsequently reconstructed at a receiving computing system while still retaining a high degree of representational quality.

More particularly, three-dimensional volumetric representations have been popular in three and four-dimensional reconstruction techniques. However, transmitting high quality three and four-dimensional sequences is still challenging due to their large memory footprints. As an example, the memory footprint associated with a compressing a mesh representation of a volume (e.g., an object, a person, etc.) is relatively high. If the data to be transmitted is four-dimensional (e.g., a series of three-dimensional frames, etc.), the memory footprint can be prohibitive to establishing quality transmission of the data. Further, the texture maps associated with these volumetric representations can necessitate the streaming of coordinates that correlate the texture maps to spatial positions on the mesh representations of the volumes.

In response to these problems, the present disclosure proposes a block-based end-to-end trainable geometry compression model based on signed distance fields (e.g., truncated signed distance fields (TSDFs), etc.) stored in the voxels that constitute a volumetric representation. The model can include lossy TSDF compression, lossy parameterization-free compression of textures, and lossless compression of the surface's topology using the conditional distribution of the TSDF signs. More particularly, the present disclosure proposes obtaining voxel blocks (e.g., subsets of voxels) from a plurality of voxels that constitutes a three-dimensional representation of an object. The voxels can include a magnitude a value and a sign value, and the voxel blocks can include a subset of the plurality of voxels. A machine-learned voxel encoding model can be used to encode the voxel blocks. A machine-learned decoding model can be used to decode the encoded voxel blocks to obtain reconstructed voxel blocks. A reconstructed mesh representation can be generated from the reconstructed voxel blocks, and the textures can be encoded based on the reconstructed mesh representation. The encoded textures (e.g., the texture atlas) can be decoded and applied to the reconstructed mesh representation to generate a reconstructed three-dimensional volumetric representation.

More particularly, an encoding computing system can obtain one or more voxel blocks from a three-dimensional volumetric representation of an object (e.g., a person, a bowling ball, etc.). The three-dimensional volumetric representation can include a plurality of voxels and a respectively associated plurality of textures. Each of the plurality of voxels can include a magnitude value and a sign value. Each of the one or more voxel blocks can include a subset of the plurality of voxels.

In some implementations, the voxel blocks can include and/or be an implicit representation of a surface of the object represented by the volume (e.g., a signed distance field, a truncated signed distance field, etc.). As an example, each voxel can include a signed distance field that implicitly represents a distance from a surface (e.g., a magnitude) and a sign value associated with the voxels spatial location in regards to the surface. For example, a voxel located "inside" the surface of a volume can have a negative sign value while a voxel located "outside" the surface of a volume can have a positive sign value. For another example, a voxel that implicitly contains a surface can have sign and magnitude values of zero (e.g., a "zero crossing). In some implementations, the voxel can contain a truncated sign distance field. More particularly, the magnitude values of the voxels can be truncated at a certain threshold. For example, a voxel located relatively far from the surface of the volume may have a magnitude value of 15. If the magnitude truncation threshold was set to 1, the value of any magnitude more than 1 can be truncated to 1. In such fashion, the less "relevant" data (e.g., voxels far away from the surface of the volume) can be truncated, therefore allowing for more efficient representation of the volume surfaces.

In some implementations, the one or more voxel blocks can be obtained based at least in part on the sign values of the voxels. More particularly, the voxel blocks can have a size of k×k×k voxels (e.g., a three-dimensional block of voxels). Each of the one or more voxel blocks can, in some implementations, be a non-overlapping voxel block that contains a zero crossing (e.g., an occupied block). As an example, the plurality of voxels can be iterated through in a block-wise fashion (e.g., iterating k×k×k voxels at a time, etc.) to determine if a current block contains a voxel with a zero-crossing. If the block does contain the voxel (e.g., a zero-crossing voxel, etc.), the block can be extracted and encoded. If the block does not contain the voxel (e.g., a zero-crossing voxel, etc.), the block can be skipped for encoding. In such fashion, the encoding computing system can extract and encode the blocks that are relevant to the surface of the object while passing over less relevant blocks, therefore substantially reducing the number of voxel blocks that are encoded and transmitted. It should be noted that, in some implementations, the size of an object and/or the volumetric size of the block may require that only one block is selected from the plurality of voxels (e.g., all of the voxels with zero crossings are contained in one block, etc.).

In some implementations, the voxel blocks can be indexed in a voxel block index. The voxel block index can store the spatial location of the voxel blocks after they are extracted. It should be noted that the extraction of voxel blocks containing a zero crossing can, in some implementations, increase the importance of maintaining spatial coherency between the extracted blocks to properly reconstruct the surface of the volume. As such, the voxel block index can be used to reconstruct the voxel blocks at their original spatial locations by a decoding computing system, as will be discussed in more detail with regards to the figures.

The encoding computing system can encode the one or more voxel blocks with a first instance of a machine-learned voxel encoding model (e.g., a trained convolutional neural network, recurrent neural network, etc.) to obtain one or more encoded voxel blocks. More particularly, given a block x to be transmitted, the encoding computing system (e.g., the sending/transmitting computing system, etc.) can compute the lossy quantized latent representation $\hat{z}=[E(x;\theta_e]$ using the machine-learned encoding model E with parameters $\theta_e$. The encoding computing system can use $\hat{z}$ to compute the conditional probability distribution over the sign values of the voxels as $p_{s|\hat{z}}(s|\hat{z};\theta_s)$, where s is the ground truth sign configuration of the block, and $\theta_s$ are the learnable parameters of the distribution. In some implementations, the encoding computing system can use an entropy encoder to compute the bitstreams $\hat{z}_{bits}$ and $s_{bits}$ by losslessly coding the latent code $\hat{z}$ and signs s using the distributions $p_{\hat{z}}(\hat{z};\phi)$ and $p_{s|\hat{z}}(s|\hat{z};\theta_s)$ respectively. As an example, $p_{\hat{z}}(\hat{z};\phi)$ can be a learned prior voxel distribution over $\hat{z}$ parameterized by $\phi$. It should be noted that, in some implementations, the prior distribution $p_{\hat{z}}$ can be trained prior to the encoding in a training phase, as will be discussed in greater detail with regards to the figures.

The encoding computing system can decode the one or more encoded voxel blocks with a first instance of a machine-learned voxel decoding model (e.g., a trained convolutional neural network, recurrent neural network, etc.) to obtain a first instance of one or more reconstructed voxel blocks. The reconstructed voxel block(s) can be a lossy reconstruction of the one or more voxel blocks. In some implementations, the reconstructed voxel blocks can be reconstructed based at least in part on the voxel index that describes a spatial location of the one or more voxel blocks.

The encoding computing system can generate a first instance of a reconstructed mesh representation of the object based at least in part on the first instance of the one or more reconstructed voxel blocks. The reconstructed mesh (e.g., a triangle mesh, etc.) can be a polygonal mesh representation of the surface of the object in the volume. The reconstructed mesh representation can, in some implementations, contain the associated plurality of textures of the three-dimensional volumetric representation. As an example, the reconstructed mesh representation can be a textured mesh representation. Alternatively, in some implementations, the reconstructed mesh representation can be reconstructed separately from the plurality of textures.

The encoding computing system can encode the plurality of textures according to an encoding scheme to obtain a plurality of encoded textures. In some implementations, the encoding can be based at least in part on the first instance of the reconstructed mesh representation of the object. More particularly, the encoding scheme can be a tracking-free UV parametrization method that can be combined with the block-level geometric encoding of the one or more voxel blocks. In some implementations, the polygons of each voxel block can be extracted and grouped based at least in part on one or more characteristics of the polygons (e.g., the normals of the polygons, texture properties associated with the textures of the polygons, etc.). As an example, the polygons of one voxel block can be grouped in one group. As another example, the polygons of one voxel block can be mapped to multiple groups.

In some implementations, the encoding computing system can generate a polygon chart that includes one or more polygon groups. The polygon chart can be configured to maintain spatial coherence between each of the polygon groups. More particularly, the average of polygon characteristic(s) (e.g., the average of the normal) of a group can be used to determine a tangent space onto which the vertices of the polygons in the group are projected. The projections can be rotated until they fit into an axis-aligned rectangle with minimum area (e.g., using rotating calipers, etc.). In some implementations, this can result in deterministic UV coordinates for each vertex in the group relative to a bounding box for the vertex projections. As an example, the bounding boxes for the group can have a size, and can be sorted by size. In some implementations, based on the sorting, the encoding computing system can pack the groups into a square polygon chart using a packing algorithm (e.g., quadtree-esque algorithm(s), etc.). Further, the UV coordinates of the polygons of the block can be offset to be relative to the chart. In such fashion, one two-dimensional chart can be generated for each three-dimensional voxel block.

In some implementations, the encoding computing system can map (e.g., pack) the polygon chart(s) into a texture atlas. The spatial location of the polygon chart(s) in the texture atlas can correspond to the spatial location of the reconstructed voxel blocks (e.g., in the original three-dimensional volumetric representation, as specified by a voxel index, etc.). The polygon charts can be mapped to the texture atlas in a manner that maximizes spatio-temporal coherence. More particularly, as described previously, each of the voxel block(s) can be indexed by a triple of integers as they initially exist in the three-dimensional volumetric representation (e.g., x,y,z coordinates, etc.). The binary representation of these integers can be converted to a representational Morton code (e.g., a 2D Morton code, a 3D Morton code, etc.). As an example, the triple of integers describing a three-dimensional spatial location of a voxel block can be converted to a 2D Morton code. For example, each polygon chart can be indexed by a pair of integers $(u, v) \in \mathbb{Z}^2$, whose 2D Morton code is the integer $M_2(u,v) = \Sigma_{b=0}^{B-1}(2u_b+v_b)2^{2b}$ whose binary representation is $u_{B-1}v_{B-1} \ldots u_0v_0$. Conversion in this manner can provide compatibility with the two-dimensional regular grid structure of a polygon chart (e.g., converting x,y,z variables to u,v variables, etc.). As another example, a three-dimensional Morton code can be generated for the texture atlas that includes and ranks the two-dimensional Morton codes of the atlas. For example, the polygon charts can be mapped for voxel blocks at volumetric position (x, y, z) to texture atlas position $(u, v) = M_2^{-1}(\text{rank}(M_3(x, y, z)))$, where rank is the rank of the 3D Morton code in the list of 3D Morton codes. In such fashion, the 3D Morton code of the atlas can use a ranking scheme to preserve the three-dimensionality of the packed textures, and can therefore be easily extracted back into a three-dimensional space by a decoder (e.g., by demultiplexing the bits of the Morton codes, etc.).

In some implementations, the encoded and/or entropy encoded voxel block(s) can be transmitted to a decoding computing system (e.g., a remote or local decoding computing system, etc.). The voxel block(s) can be transmitted alongside the voxel block index and the plurality of encoded textures. Transmission can be facilitated via a network (e.g., local area network, wireless network, etc.) or storage media (e.g., a flash drive, hard drive, etc.).

In some implementations, the decoding computing system can receive the encoded voxel block(s) and decode the encoded voxel block(s) with a second instance of the machine-learned voxel decoding model to obtain a second instance of the one or more reconstructed voxel blocks. It should be noted that the machine-learned voxel decoding model can be a pre-trained, deterministic model. As such, the outputs of the first instance of the machine-learned voxel decoding model (e.g., on the encoding computing system) and the second instance of the model (e.g., on the decoding computing system) can produce identical, deterministic outputs given the same input. As such, the first instance of the reconstructed blocks on the encoding computing system will be the same as or substantially similar to the second instance of the reconstructed blocks on the decoding computing system (e.g., due to transmission loss, etc.). In such fashion, the textures encoded based on the first instance of the reconstructed blocks will be more compatible with the second instance of the reconstructed blocks (e.g., for application to the blocks and/or a product of the blocks, etc.).

More particularly, in some implementations, the machine-learned decoding model of the decoding computing system can receive the latent representation $\hat{z}$ and the associated signs. Alternatively, in some implementations, the decoding computing system can receive bitstreams $\hat{z}_{bits}$ and $s_{bits}$ from the encoding computing system and use an entropy decoder to recover $\hat{z}$ with the learned voxel distribution (e.g., the learned voxel distribution of the encoding computing system). The decoding computing system can use $\hat{z}$ to re-compute $p_{s|\hat{z}}$ in order to recover the losslessly coded ground truth signs s. The decoding computing system can recover lossy TSDF values (e.g., magnitudes, etc.) by using the machine-learned voxel decoding model D in conjunction with the ground truth signs s as $\hat{x} = s \odot |D(\hat{z};\theta_d)|$, where $\odot$ is the element—wise product operator, $|\cdot|$ the element—wise absolute value operator, and $\theta_d$ the parameters of the machine-learned decoding model. In such fashion, the one or more encoded voxel blocks can be decoded by the decoding computing system with the machine-learned decoding model to obtain the one or more reconstructed voxel blocks In some implementations, the decoding computing system can decode the received encoded textures to obtain a plurality of decoded textures. The textures can be decoded according to the encoding scheme used by the encoding computing system. More particularly, the bits of the texture atlas (e.g., the Morton codes) containing the textures can be demultiplexed and used to decode the textures in a manner that maintains the spatial coherence of the textures.

In some implementations, the plurality of decoded textures can be applied to the second instance of the one or more reconstructed voxel blocks to obtain a reconstructed three-dimensional volumetric representation of the object. More particularly, the decoding computing system can first generate a second instance of the reconstructed mesh representation in the same fashion as the encoding computing system (e.g., using a marching cubes algorithm with the reconstructed voxel blocks, etc.). It should be noted that the second instance of the reconstructed mesh representation can be identical or substantially similar to the first instance on the encoding computing system. The plurality of decoded textures can be applied to the reconstructed mesh representation (e.g., a polygonal mesh, etc.) in the manner specified by the demultiplex Morton codes of the texture atlas. Since the plurality of decoded textures are packed into the texture atlas in a manner that maintains spatial and positional coherence, the textures can easily be unpacked and iteratively applied to the mesh in the same order they were extracted.

In some implementations, a computing system can train the models and distributions of the present embodiment in an end-to-end fashion. More particularly, a loss function can be evaluated, and based on the loss function, one or more parameters can be adjusted for at least one of the machine-learned voxel encoding model, the machine-learned voxel decoding model, the learned voxel distribution, or the learned sign distribution. It should be noted that the computing system can include and use all of the above models. As such, the inclusion of an entropy encoder and entropy decoder for transmission is unnecessary. Instead, in some implementations, uniform noise can be added during the training step to simulate the entropy encoding and decoding that occurs during the inference step (e.g., the usage of the encoding and/or decoding computing systems, etc.). Additionally, or alternatively, in some implementations the uniform noise can be added during the training step to simulate the quantization noise resulting from quantization before the encoding step.

In some implementations, the loss function can evaluate a difference between the one or more voxel blocks and the one or more reconstructed voxel blocks. The loss function may further evaluate one or more bit-rate terms that each evaluate a measure of the number of bits used to encode a part of the encoded signal. More particularly, the loss function can evaluate a distortion, a latent bit rate, and a sign bit rate as described as $$\arg\min_\Theta \underbrace{D_{\hat{x}}(x, \hat{x}; \theta_e, \theta_d)}_{distortion} + \lambda \left[ \underbrace{R_{\hat{z}}(\hat{z}; \phi)}_{latents bitrate} + \underbrace{R_s(s; \theta_s)}_{signs bitrate} \right].$$

In some implementations, the distortion parameter $D_{\hat{x}}(x, \hat{x}; \theta_e, \theta_d)$ can evaluate a reconstruction error between the ground truth and the predicted voxel values (e.g., TSDF values, magnitudes, etc.). A mask can be used to focus the training of the model(s) on more "relevant" voxels of the voxel blocks (e.g., the voxels with a neighboring voxel of an opposing sign value). As an example, for each dimension, a mask can be created for important voxels, namely $m_x$, $m_y$ and $m_z$. Voxels that have more than one neighbor with opposing signs can appear in multiple masks, further increasing weights of these voxels. The masks can be used to calculate the squared differences for important voxels, as specified by $$D_{\hat{x}} = \frac{1}{B} \sum_{n=1}^{B} \sum_{d \in x,y,z} \|m_d \cdot (\hat{x}_n - x_n)\|_2^2 \text{ for } B \text{ blocks.}$$

In some implementations, the latent bit rate parameter $R_{\hat{z}}(\hat{z}; \phi)$ can evaluate an estimate of the differential entropy of the noisy codes $z+\mathcal{U}$ [−0.5,0.5]. As an example, the latent bit rate metric can provide an estimate of the entropy caused by the noise in the codes as coded by the entropy coder. In such fashion, the latent bit rate parameter can reduce the bit rate of the compressed codes, allowing for more efficient compression.

In some implementations, the signs bit rate parameter $R_s(s; \theta_s)$ can evaluate the rate of lossless compression of the sign values for each of the plurality of voxels of the three-dimensional volumetric representation. Since S contains only discrete values {−1,+1}, it can be compressed losslessly using entropy coding. As mentioned previously, the conditional probability distribution $p_{s|\hat{z}}(s|\hat{z})$ can be used instead of the prior distribution $p_s(s)$. It should be noted that, in some implementations, the conditional distribution can have a much lower entropy than the priors, since s is dependent on the $\hat{z}$ by design. This allows for more efficient compression of the sign values.

To make this dependency explicit, an extra head can, in some implementations, be added to the architecture of the machine-learned decoding model. More particularly, in some implementations, the machine-learned decoding model can be or otherwise include a convolutional neural network with a final convolutional layer including two convolutional heads. The convolutional heads can respectively generate the reconstructed $\hat{z}$ and the s (e.g., the sign values), such that $p_s(s|\hat{z})=\mathcal{D}_s(\hat{z})$, and $\hat{x}=se|\mathcal{D}_b(\hat{z})|$. The sign rate loss $R_s$ can then be the cross entropy between the ground truth signs s, with −1 remapped to 0, and their conditional predictions $p_s(s|\hat{z})$. In such fashion, minimizing the sign bit rate parameter $R_s(s; \theta_s)$ can train the network to make more accurate sign predictions while also minimizing the bit rate of the compressed sign values.

The present disclosure provides a number of technical effects and benefits. As one example technical effect and benefit, the systems and methods of the present disclosure enable a significant advancement in compression of three-dimensional volumes in comparison to other approaches. While other methods are generally directed to compressing of mesh representations of a three-dimensional object, the current embodiments provide for three-dimensional representation using implicit representations (e.g., signed distance fields, etc.) alongside a novel texture compression algorithm corresponding to the implicit volumetric representation. This functionality provides for significant improvements in the compressed size of volumetric representations while still maintaining a very high degree of reconstruction accuracy. By reducing the size of the compressed representation, the present embodiments drastically reduce the network resources used to transmit and receive volumetric representations. In turn, this reduces processing resources, memory resources, and power resources required to send and transmit three-dimensional representations.

With reference now to the Figures, example embodiments of the present disclosure will be discussed in further detail.

Example Devices and Systems

FIG. 1A depicts a block diagram of an example computing system 100 that performs compression of three-dimensional volumetric representations according to example embodiments of the present disclosure. The system 100 includes an encoding computing system 102, a decoding computing system 130, and a training computing system 150 that are communicatively coupled over a network 180.

The encoding computing system 102 can be any type of computing system or device, such as, for example, a personal computing device (e.g., laptop or desktop), a mobile computing device (e.g., smartphone or tablet), a gaming console or controller, a wearable computing device, an embedded computing device, a computing server (e.g., a cloud-based server platform, etc.), a virtualized computing server, or any other type of computing device or system.

The encoding computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the encoding computing system 102 to perform operations.

In some implementations, the operations performed by the processor 112 can include texture encoding operations. More particularly, the operations can include generating a texture atlas to encode and store textures associated with a volumetric representation in a lossless fashion. The texture atlas can be packed with the corresponding textures using certain algorithmic operations (e.g., a marching cube algorithm, etc.). In some implementations, the texture encoding operations can correspond to the operation and/or outputs of the instances of the machine-learned encoding and decoding models 120 (e.g., encoding the textures based on a deterministic lossy output of the machine-learned encoding and decoding models, etc.). Example implementations of the texture encoding operations and/or their relation to the model instances 120 and 140 are discussed with reference to FIG. 3.

In some implementations, the encoding computing system 102 can store or include instances of machine-learned encoding model(s) and machine-learned decoding model(s) 120. For example, the model instances 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example model instances 120 are discussed with reference to FIGS. 2-3.

In some implementations, the one or more model instances 120 can be received from the decoding computing system 130 over network 180, stored in the encoding computing system memory 114, and then used or otherwise implemented by the one or more processors 112. In some implementations, model instances 120 and 140 can be instances of the same machine-learned encoding model and machine-learned decoding model. More particularly, the instances can be parallel instances trained (e.g., at training computing system 150, etc.) in the same fashion and distributed to both the decoding computing system 130 and the encoding computing system 102 (e.g., over network 180, etc.). In such fashion, the parallel instances (e.g., instances 120 and instances 140) can, in some implementations, perform identical operations (e.g., encoding and decoding operations) in a deterministic manner. For example, the instances 120 and 140 could each receive an identical input and generate respectively identical outputs.

More particularly, instances of machine-learned encoding and decoding models 120 can be used to encode and decode the geometry (e.g., voxels containing truncated signed distance fields, etc.) of a three-dimensional volumetric representation in a lossy fashion. In some implementations, the three-dimensional volumetric representation can be generated at the encoding computing system 102. For example, the volumetric data can be captured using an associated and/or connected imaging device (e.g., multiple cameras configured to capture a three-dimensional volumetric representation, etc.). In some implementations, the encoding computing system 102 can receive data describing the three-dimensional volumetric representation (e.g., via network 180, flash memory, physical storage media, etc.).

The instance of the machine-learned encoding model 120 can be used to generate one or more encoded voxel blocks. The one or more encoded voxel blocks can be decoded by the instance of the machine-learned decoding model 120 to generate one or more reconstructed voxel blocks. In some implementations, the reconstructed voxel block(s) can be used in part by the encoding computing system 102 to encode the textures associated with the three-dimensional volumetric representation. The encoding computing system 102 can transmit the encoded textures to the decoding computing system 130 (e.g., via network 180). Alternatively, or additionally, in some implementations, the encoded voxel block(s) can be transmitted to the decoding computing system 130 (e.g., via network 180).

Additionally or alternatively, the instances of the machine-learned encoding and decoding models 140 can be included in or otherwise stored and implemented by the decoding computing system 130 that communicates with the encoding computing system 102 according to a sender-receiver relationship, or vice-versa. For example, the instances of the machine-learned encoding and decoding models 140 can be implemented by the decoding computing system 130 to decode encoded textures and/or geometry of a three-dimensional representation. As an example, the decoding computing system 130 can utilize an instance of the machine-learned decoding mode 140 to decode the encoded voxel block(s) transmitted to the decoding computing system 130 from the encoding computing system 102 (e.g., via network 180). By decoding the encoded voxel block(s), the decoding computing system 130 can generate reconstructed voxel block(s). The decoding computing system 130 can generate a reconstructed mesh representation from the reconstructed voxel block(s). Further, the decoding computing system 130 can decode the encoded textures to generate decoded textures (e.g., based on the reconstructed voxel block(s) and/or the reconstructed mesh representation, etc.). The decoding computing system 130 can apply the decoded textures to the reconstructed mesh representation to generate a reconstructed three-dimensional volumetric representation. Thus, in such fashion, instances of the machine-learned encoding and decoding models 120 can be stored and implemented at the encoding computing system 102 and instances of the same machine-learned encoding and decoding models 140 can be stored and implemented at the decoding computing system 130.

The decoding computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the decoding computing system 130 to perform operations.

In some implementations, the encoding computing system 102 includes or is otherwise implemented by one or more encoding computing devices. In instances in which the encoding computing system 102 includes plural encoding computing devices, such encoding computing devices can operate according to sequential computing architectures, parallel computing architectures, or some combination thereof.

In some implementations, the decoding computing system 130 includes or is otherwise implemented by one or more decoding computing devices. In instances in which the decoding computing system 130 includes plural decoding computing devices, such decoding computing devices can operate according to sequential computing architectures, parallel computing architectures, or some combination thereof.

It should be noted that the terms "encoding computing system" and "decoding computing system" are, in some implementations, merely used to more easily describe the functionality of the present embodiments. More particularly, in some implementations, the decoding computing system 130 can be utilized as an encoding computing system and the encoding computing system 102 can be utilized as a decoding computing system. As an example, the operations as described previously for the encoding computing system 102 can be performed at the decoding computing system 130 and vice-versa. In such fashion, both computing systems (e.g., systems 102 and 130) can be utilized to encode and/or decode three-dimensional volumetric representations or any components thereof (e.g., voxels, encoded voxel block(s), textures, encoded textures, etc.).

The encoding computing system 102 and/or the decoding computing system 130 can train the base models of the model instances 120 and/or 140 via interaction with the training computing system 150 that is communicatively coupled over the network 180. The training computing system 150 can be separate from the encoding computing system 102 and the decoding computing system 130. Alternatively, or additionally, the training computing system 150 can be a portion of the decoding computing system 130 and/or the encoding computing system 102 (e.g., as multiple instances of a training computing system in one or more of the other systems and/or devices, etc.).

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more decoding computing devices.

The training computing system 150 can include a model trainer 160 that trains the machine-learned models of model instances 120 and 140 stored at the encoding computing system 102 and the decoding computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the OVERALL models 120 and/or 140 based on a set of training data 162. The training data 162 can include, for example, three-dimensional volumetric representation(s) including voxels that store truncated signed distance fields (TSDFs). The voxels can include a known sign value and a known magnitude value (e.g., ground truth values). The implementation of training by the model trainer 160 (e.g., evaluation of a loss function, loss function parameter(s), etc.) will be discussed in greater detail with regards to FIG. 5.

In some implementations, if the user has provided consent, the training examples can be provided by the encoding computing system 102 and/or the decoding computing system 130. Thus, in such implementations, the instances of the models 120 and 140 provided to the encoding computing system 102 and decoding computing system 130 can be trained by the training computing system 150 on data obtained by one of the computing systems (e.g., systems 102 and/or 130). In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the encoding computing system 102 can include the model trainer 160 and the training dataset 162. In such implementations, the models for the instances 120 and 140 can be both trained and used locally at the encoding computing system 102 and/or the decoding computing system 130. In some of such implementations, the encoding computing system 102 and/or the decoding computing system 130 can implement the model trainer 160 to personalize the models of model instances 120 and 140 based on data obtained by one or both of the computing systems (e.g., systems 102 and 130).

Figure 1B:
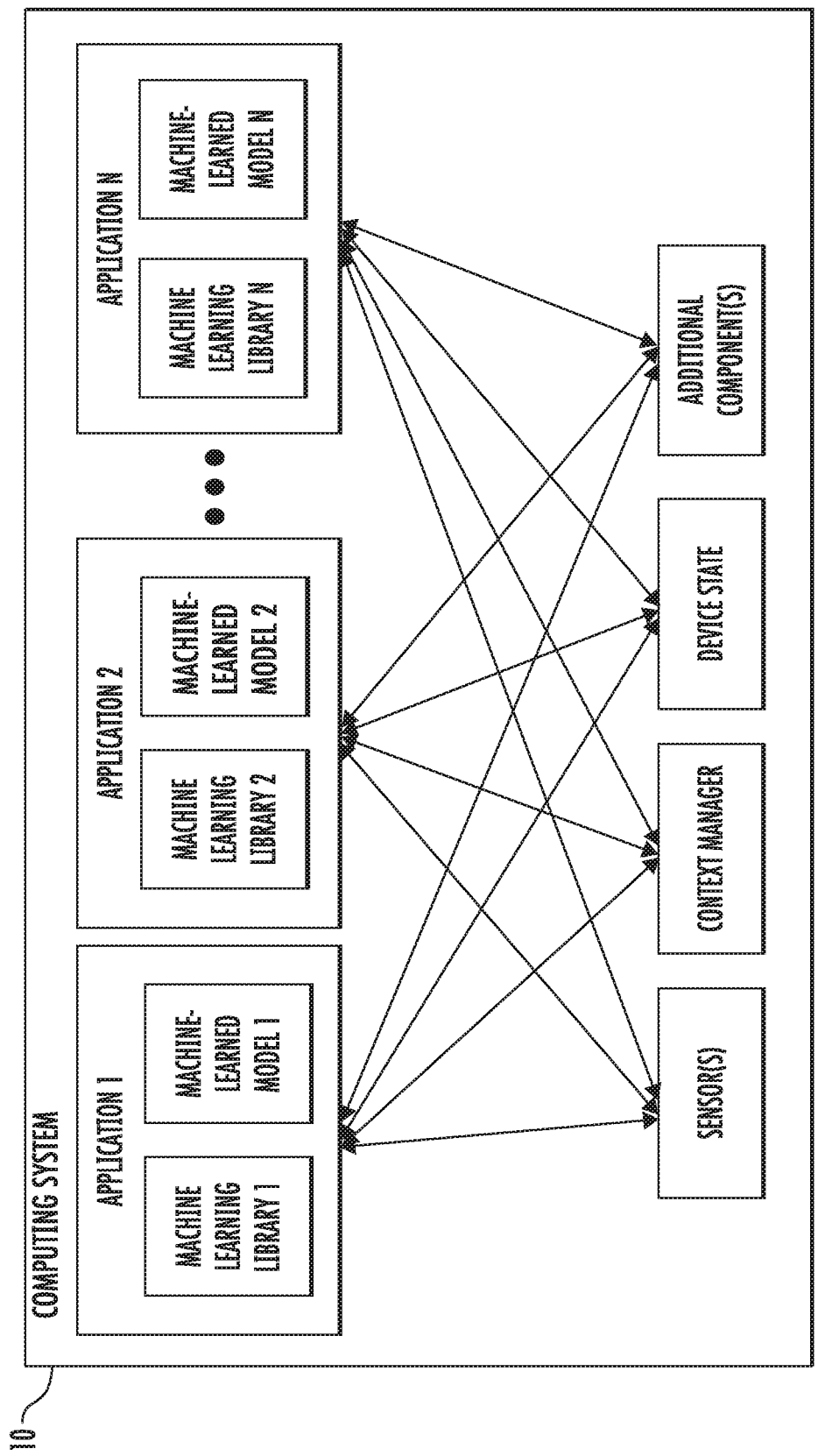
FIG. 1B depicts a block diagram of an example computing device that perform operations according to example embodiments of the present disclosure.

FIG. 1B depicts a block diagram of an example computing system 10 that performs according to example embodiments of the present disclosure. The computing system 10 can be an encoding computing system and/or a decoding computing system.

The computing system 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing system, such as, for example, one or more sensors, a context manager, a device state component, and/or additional components. In some implementations, each application can communicate with each device component using an API (e.g., a public API). In some implementations, the API used by each application is specific to that application.

Figure 1C:
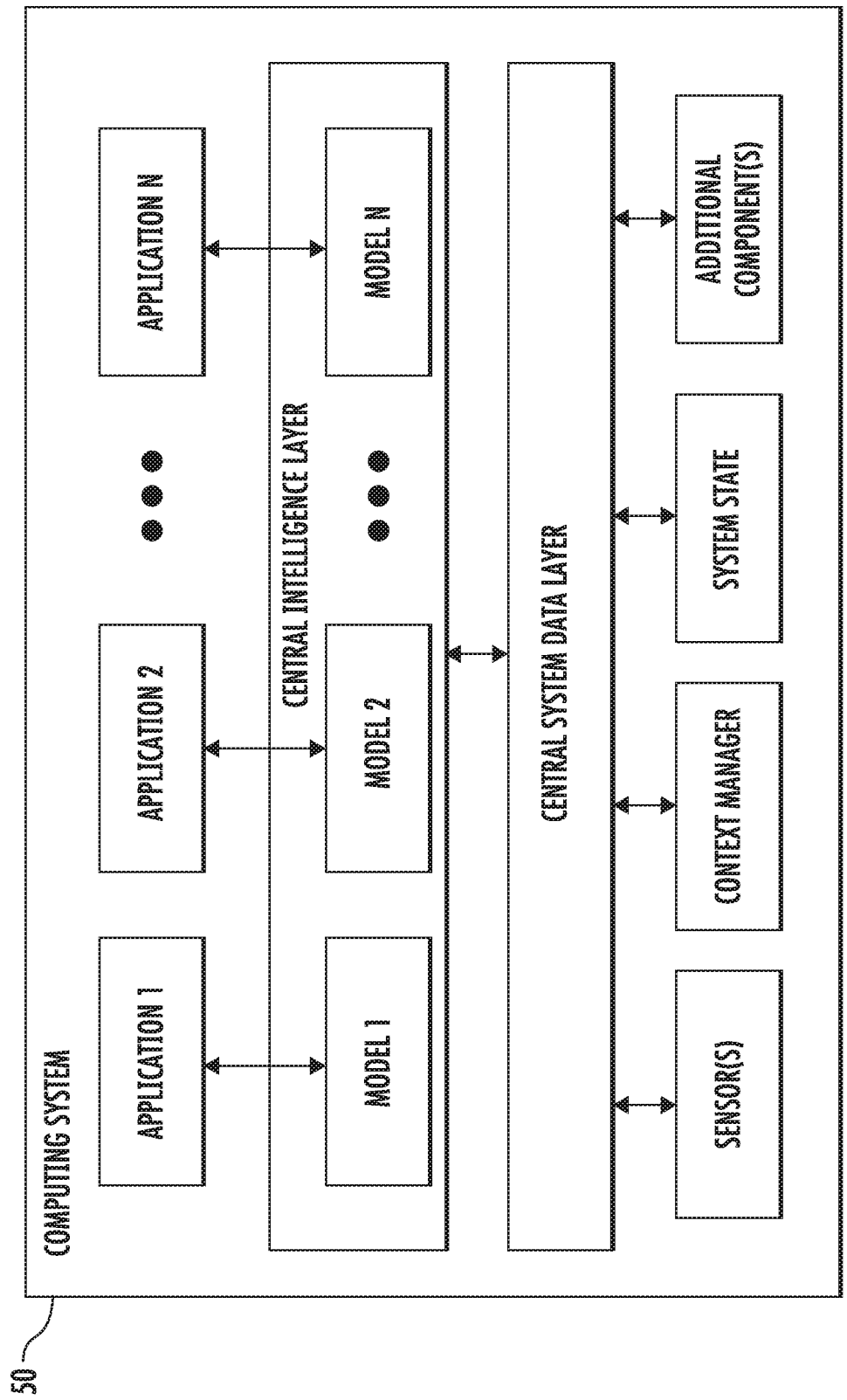
FIG. 1C depicts a block diagram of an example computing device that perform operations according to example embodiments of the present disclosure.

FIG. 1C depicts a block diagram of an example computing system 50 that performs according to example embodiments of the present disclosure. The computing system 50 can be an encoding computing system and/or a decoding computing system.

The computing system 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 50. In some implementations, the model(s) can be instances of one or more model(s). As an example, model 1 and model 2 can be two parallel instances of a single machine-learned model.

The central intelligence layer can communicate with a central system data layer. The central system data layer can be a centralized repository of data for the computing system 50. As illustrated in FIG. 1C, the central system data layer can communicate with a number of other components of the computing system, such as, for example, one or more sensors, a context manager, a system state component, and/or additional components. In some implementations, the central system data layer can communicate with each device component using an API (e.g., a private API).

Example Model Arrangements

Figure 2:
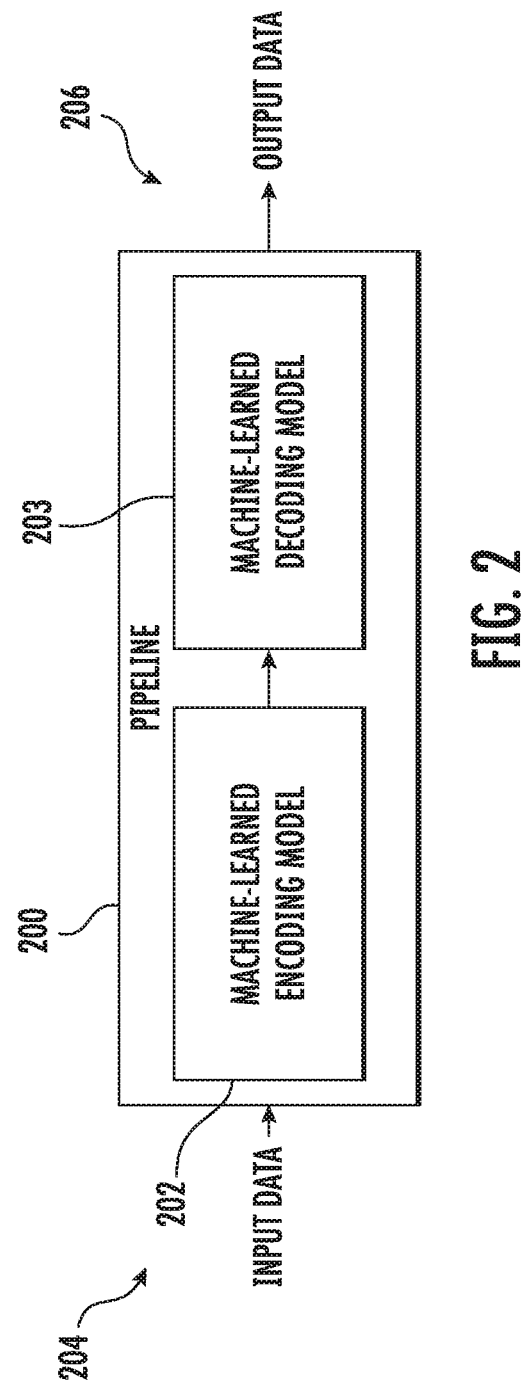
FIG. 2 depicts a block diagram of an example machine-learned encoding and decoding pipeline according to example embodiments of the present disclosure.

FIG. 2 depicts a block diagram of an example compression pipeline 200 according to example embodiments of the present disclosure. In some implementations, the pipeline 200 includes two or more machine-learned models and/or two more instances of machine-learned model(s) (e.g., machine-learned encoding model 202 and machine-learned decoding model 203). The models of pipeline 200 are trained to receive a set of input data 204 descriptive of a three-dimensional volumetric representation and, as a result of receipt of the input data 204, provide output data 206 that describes a lossy reconstruction of the three-dimensional volumetric representation. Thus, in some implementations, the pipeline 200 can include an instance of a machine-learned encoding model 202 that is operable to lossily encode the input data and an instance of a machine-learned decoding model 203 that is operable to decode the input data and generate the output data (e.g., the lossy reconstruction of a three-dimensional volumetric representation).

Figure 3:
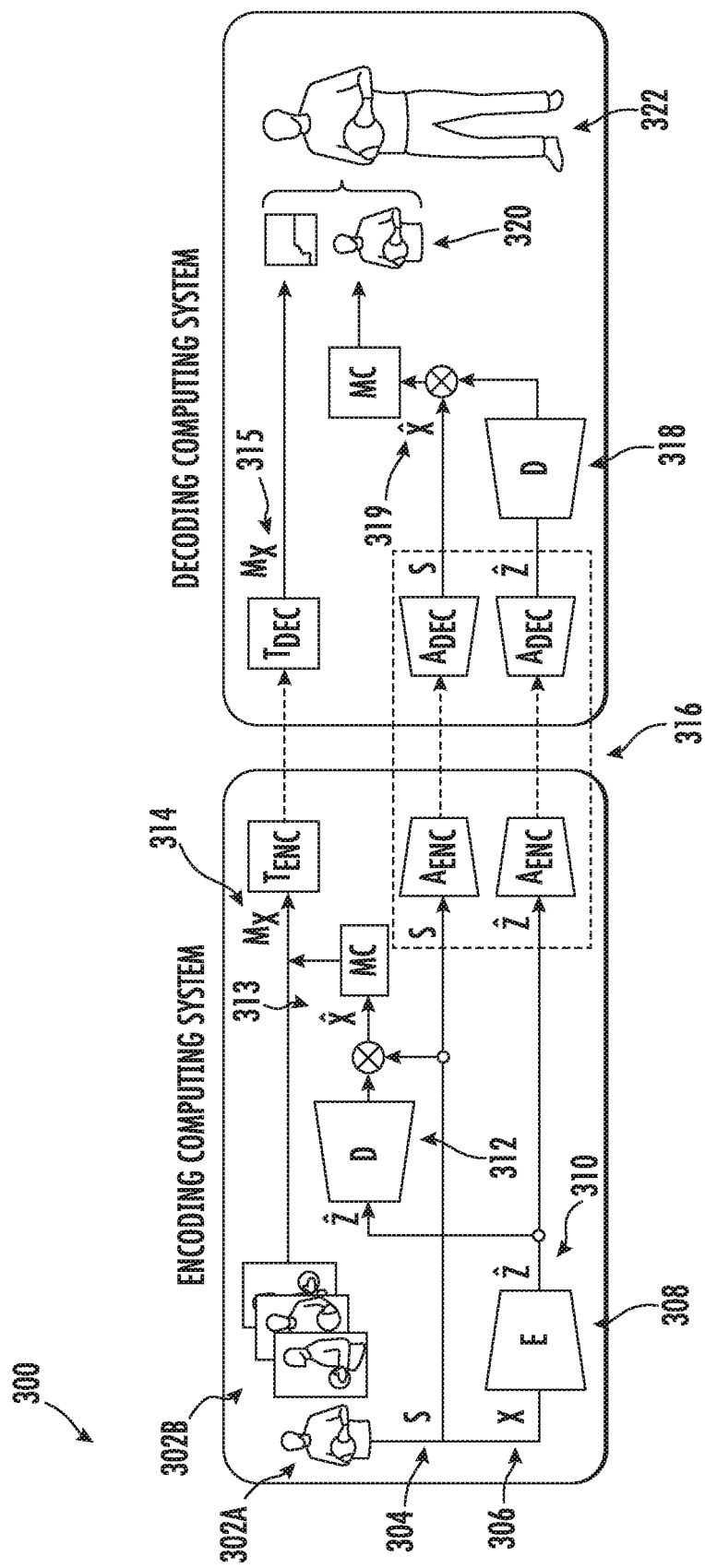
FIG. 3 depicts a flow diagram depicting encoding and decoding of a three-dimensional volumetric representation according to example embodiments of the present disclosure.

FIG. 3 depicts a flow diagram depicting encoding and decoding of a three-dimensional volumetric representation according to example embodiments of the present disclosure. The compression pipeline 300 is similar to the compression pipeline 200 of FIG. 2 except that the pipeline 300 further includes a second instance of a machine-learned decoding model. More particularly, the compression pipeline 300 is depicted as being distributed across a plurality of computing systems (e.g., an encoding computing system and a decoding computing system). It should be noted that this distribution does not necessarily change the core functionality (e.g., inputs, outputs, operations, etc.) of pipeline 300 in comparison to pipeline 200 of FIG. 2.

More particularly, the encoding computing system can obtain a three-dimensional volumetric representation 302. The three-dimensional volumetric representation 302 can include one or more voxel blocks 302A (e.g., a geometry of the three-dimensional volumetric representation 302, etc.) and an associated plurality of textures 302B. The voxel block(s) 302A can include and/or otherwise be voxel blocks (e.g., subsets of voxels) obtained by the encoding computing system from a plurality of voxels that constituted the three-dimensional volumetric representation 302. The voxels of the voxel block(s) 302A can include a magnitude a value and a sign value, and the voxel block(s) 302A can include a subset of the plurality of voxels.

In some implementations, the voxel block(s) 302A can include and/or be an implicit representation of a surface of an object represented by the three-dimensional volumetric representation 302 (e.g., a signed distance field, a truncated signed distance field, etc.). As an example, each voxel can include a signed distance field that implicitly represents a distance from a surface (e.g., a magnitude) and a sign value associated with the voxels spatial location in regards to the surface. For example, a voxel located "inside" the surface of a volume can have a negative sign value while a voxel located "outside" the surface of a volume can have a positive sign value. For another example, a voxel that implicitly contains a surface can have sign and magnitude values of zero (e.g., a "zero crossing). In some implementations, the voxel can contain a truncated sign distance field. More particularly, the magnitude values of the voxels can be truncated at a certain threshold. For example, a voxel located relatively far from the surface of the volume may have a magnitude value of 15. If the magnitude truncation threshold was set to 1, the value of any magnitude more than 1 can be truncated to 1. In such fashion, the less "relevant" data (e.g., voxels far away from the surface of the volume) can be truncated, therefore allowing for more efficient representation of the volume surfaces.

In some implementations, the voxel block(s) 302A can be obtained based at least in part on the sign values of the voxels. More particularly, the voxel block(s) 302A can have a size of k×k×k voxels (e.g., a three-dimensional block of voxels). Each of the voxel block(s) 302A can, in some implementations, be a non-overlapping voxel block that contains a zero crossing (e.g., an occupied block). As an example, the plurality of voxels can be iterated through in a block-wise fashion (e.g., iterating k×k×k voxels at a time, etc.) to determine if a current block contains a voxel with a zero-crossing. If the block does contain the voxel, it can be extracted and encoded. If the block does not contain the voxel, the block can be skipped for encoding. In such fashion, the encoding computing system can extract and encode the blocks that are relevant to the surface of the object while passing over less relevant blocks, therefore substantially reducing the number of voxel blocks that are to be encoded and transmitted. The voxels of the voxel block(s) 32A can include a magnitude value x 306 and a sign value s 304. It should be noted that, in some implementations, the size of an object and/or the volumetric size of the block may require that only one block is selected from the plurality of voxels that constitute the three-dimensional volumetric representation 302 (e.g., all of the voxels with zero crossings are contained in one block, etc.).

In some implementations, the voxel block(s) 302A can be indexed in a voxel block index. The voxel block index can store the spatial location of the voxel block(s) 302A after they are extracted. It should be noted that the extraction of voxel block(s) 302A containing a zero crossing can, in some implementations, increase the importance of maintaining spatial coherency between the extracted blocks to properly reconstruct the surface of the volume. As such, the voxel block index can be used to reconstruct the voxel block(s) at their original spatial locations by the decoding computing system.

The encoding computing system can encode the voxel block(s) 302A with a first instance of a machine-learned voxel encoding model 308 (e.g., a trained convolutional neural network, recurrent neural network, etc.) to obtain one or more encoded voxel blocks 310. More particularly, given a block x 306 to be transmitted, the encoding computing system (e.g., the sending/transmitting computing system, etc.) can compute the lossy quantized latent representation $\hat{z}=[E(x;\theta_e)]$ using the machine-learned encoding model E with parameters $\theta^e$. The encoding computing system can use the encoded voxel blocks 310 to compute the learned sign distribution over the sign values 304 of the voxels 302A as $p_{s|\hat{z}}(s|\hat{z};\theta_s)$, where signs 304 (s) is the ground truth sign configuration of the block, and $\theta_s$ are the learnable parameters of the learned sign distribution.

The encoding computing system can decode the encoded voxel block(s) 310 with a first instance of a machine-learned voxel decoding model 312 (e.g., a trained convolutional neural network, recurrent neural network, etc.) to obtain a first instance of one or more reconstructed voxel blocks 313. The reconstructed voxel block(s) 313 can be a lossy reconstruction of the voxel block(s) 302A. In some implementations, the reconstructed voxel blocks 313 can be reconstructed based at least in part on the voxel index that describes a spatial location of the one or more voxel blocks 302A.

The encoding computing system can generate a first instance of a reconstructed mesh representation of the object based at least in part on the first instance of the one or more reconstructed voxel blocks 313. The reconstructed mesh (e.g., a triangle mesh, etc.) can be a polygonal mesh representation of the surface of the object in the three-dimensional volumetric representation 302. The reconstructed mesh representation can, in some implementations, contain the associated plurality of textures 302B of the three-dimensional volumetric representation 302. As an example, the reconstructed mesh representation can be a textured mesh representation (e.g., with textures 302B). Alternatively, in some implementations, the reconstructed mesh representation can be reconstructed separately from the plurality of textures 302B and can be used to extract the plurality of textures 302B from the three-dimensional volumetric representation 302.

The encoding computing system can encode the plurality of textures 302B according to an encoding scheme to obtain a plurality of encoded textures 314. In some implementations, the encoding can be based at least in part on the first instance of the reconstructed mesh representation of the object. More particularly, the encoding scheme can be a tracking-free UV parametrization method that can be combined with the block-level geometric encoding of the one or more voxel blocks 302A. In some implementations, the polygons of each voxel block can be extracted and grouped based at least in part on one or more characteristics of the polygons (e.g., the normals of the polygons, texture properties associated with the textures of the polygons, etc.). As an example, the polygons of one voxel block can be grouped in one group. As another example, the polygons of one voxel block can be mapped to multiple groups.

In some implementations, the encoding computing system can use an entropy encoder/decoder 316 to compute the bitstreams $\hat{z}_{bits}$ and $s_{bits}$ by losslessly coding the latent code $\hat{z}$ (e.g., encoded voxel block(s) 310) and signs s 304 using the distributions $p_{\hat{z}}(\hat{z};\phi)$ and $p_{s|\hat{z}}(s|\hat{z};\theta_s)$ respectively. As an example, $p_{\hat{z}}(\hat{z};\phi)$ can be a learned prior voxel distribution over $\hat{z}$ (e.g., encoded voxel block(s) 310) parameterized by $\phi$. It should be noted that, in some implementations, the learned voxel distribution and learned sign distribution can be trained prior in a training phase, as will be discussed in greater detail with regards to FIG. 5.

In some implementations, the encoded and/or entropy encoded voxel block(s) 310 can be transmitted to a decoding computing system (e.g., a remote or local decoding computing system, etc.). The encoded voxel block(s) 310 (e.g., and the signs 304) can be transmitted alongside the voxel block index and the plurality of encoded textures 314. Transmission can be facilitated via a network (e.g., local area network, wireless network, etc.) or storage media (e.g., a flash drive, hard drive, etc.) as depicted in FIG. 1A.

The decoding computing system can receive the encoded voxel block(s) 310 and decode the encoded voxel block(s) 310 with a second instance of the machine-learned voxel decoding model 318 to obtain a second instance of the one or more reconstructed voxel blocks 319. It should be noted that the second instance of the machine-learned voxel decoding model 318 can be a pre-trained, deterministic model. As such, the outputs of the first instance of the machine-learned voxel decoding model 312 and the second instance of the model 318 can produce identical, deterministic outputs 313 and 319. Thus, the first instance of the reconstructed blocks 313 on the encoding computing system can be the same as or substantially similar to the second instance of the reconstructed blocks 319 on the decoding computing system. In such fashion, the textures encoded based on the first instance of the reconstructed blocks 313 will be more compatible with the second instance of the reconstructed blocks 319 (e.g., for application to the blocks and/or a product of the blocks, etc.).

More particularly, in some implementations, the machine-learned decoding model 319 of the decoding computing system can receive the latent representation $\hat{z}$ (e.g., encoded voxel block(s) 310) and the associated signs 304. Alternatively, in some implementations, the decoding computing system can receive bitstreams $\hat{z}_{bits}$ and $s_{bits}$ from the encoding computing system and use the entropy encoder/decoder 316 to recover $\hat{z}$ 310 with the learned voxel distribution (e.g., the learned voxel distribution of the encoding computing system). The decoding computing system can use $\hat{z}$ 310 to re-compute $P_{s|\hat{z}}$ (e.g., the learned sign distribution) in order to recover the losslessly coded ground truth signs s 304. The decoding computing system can recover lossy TSDF values (e.g., magnitudes 306, etc.) by using the second instance of the machine-learned voxel decoding model 318 in conjunction with the ground truth signs 304 as $\hat{x}=s\odot|D(\hat{z};\theta_d)|$, where $\odot$ is the element-wise product operator, $|\cdot|$ the element-wise absolute value operator, and $\theta_d$ the parameters of the machine-learned decoding model. In such fashion, the one or more encoded voxel blocks 310 can be decoded by the decoding computing system with the second instance of the machine-learned decoding model 318 to obtain the one or more reconstructed voxel blocks 319.

In some implementations, the decoding computing system can decode the received encoded textures 314 to obtain a plurality of decoded textures 315. The textures can be decoded according to the encoding scheme used by the encoding computing system. More particularly, the bits of the texture atlas of the encoded textures 314 (e.g., the Morton codes) containing the textures can be demultiplexed and used to decode the textures in a manner that maintains the spatial coherence of the textures.

In some implementations, the plurality of decoded textures 315 can be applied to the second instance of the one or more reconstructed voxel blocks 319 to obtain a reconstructed three-dimensional volumetric representation of the object 322. More particularly, the decoding computing system can first generate a second instance of the reconstructed mesh representation 320 in the same fashion as the encoding computing system (e.g., using a marching cubes algorithm with the reconstructed voxel blocks, etc.). It should be noted that the second instance of the reconstructed mesh representation 320 can be identical or substantially similar to the first instance on the encoding computing system. The plurality of decoded textures 315 can be applied to the reconstructed mesh representation 320 (e.g., a polygonal mesh, etc.) in the manner specified by the demultiplexed Morton codes of the texture atlas. Since the plurality of decoded textures 315 are packed into the texture atlas in a manner that maintains spatial and positional coherence, the textures can easily be unpacked and iteratively applied to the reconstructed mesh 320 in the same order they were extracted.

Figure 4:
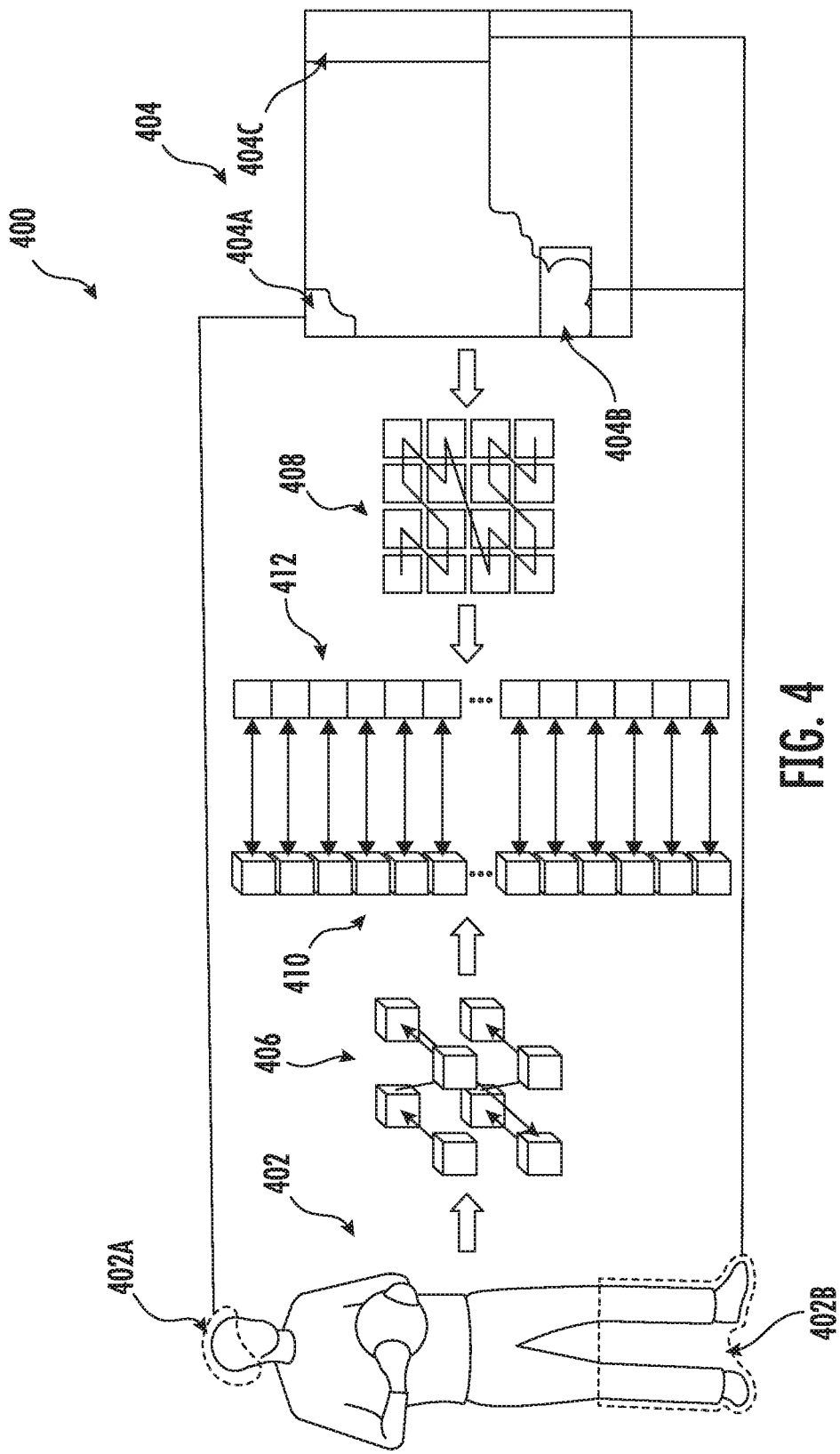
FIG. 4 depicts a flow diagram depicting an encoding scheme for encoding a plurality of textures respectively associated with the geometry of a three-dimensional volumetric representation according to example embodiments of the present disclosure.

FIG. 4 depicts a flow diagram depicting an encoding scheme for encoding a plurality of textures respectively associated with the geometry of a three-dimensional volumetric representation according to example embodiments of the present disclosure. More particularly, an encoding computing system can obtain a plurality of voxel blocks 402 from a three-dimensional volumetric representation. The three-dimensional volumetric representation can include a plurality of voxels (e.g., the voxels of voxel blocks 402) and a respectively associated plurality of textures. Each voxel block can have a three-dimensional location. As an example, the three-dimensional location (e.g., as integer x,y,z coordinates, etc.) of a voxel block from block group 402A would have a higher z coordinate relative to a voxel block from block group 402B. A plurality of texture charts 408 can be respectively associated with the plurality of voxel blocks 402.

The encoding computing system generate a respective plurality of Morton codes 406 for the plurality of voxel blocks 402. The Morton codes can be based on the three-dimensional location (e.g., as integer x,y,z coordinates, etc.). More particularly, the binary representation of the integers that index the spatial location of the voxel blocks (e.g., the x,y,z coordinates) can be converted to a representational Morton code (e.g., a 2D Morton code, a 3D Morton code, etc.). As an example, the triple of integers describing a three-dimensional spatial location of a voxel block can be converted to a 2D Morton code. For example, each texture chart 408 can be indexed by a pair of integers $(u, v) \in \mathbb{Z}^2$, whose 2D Morton code is the integer $M_2(u, v) = \sum_{b=0}^{B-1} (2u_b + v_b)2^{2b}$ whose binary representation is $u_{B-1}v_{B-1} \ldots u_0v_0$. Conversion in this manner can provide compatibility with the two-dimensional regular grid structure of a texture atlas 404 (e.g., converting x,y,z variables to u,v variables, etc.).

The encoding computing system can determine a code ranking 410 that ranks each of the plurality of Morton codes 406. More particularly, a three-dimensional Morton code can be generated for the texture atlas 404 that includes and ranks the Morton codes of the texture atlas 404. The texture charts 408 can be mapped to the voxel blocks at volumetric position (x, y, z) to texture atlas position $(u, v) = M_2^{-1}(\text{rank}(M_3(x, y, z)))$, where rank is the rank of the 3D Morton code in the list of 3D Morton codes. As an example, the ranked Morton codes 410 of the voxel blocks can be used to rank their corresponding texture charts (e.g., ranked texture charts 412). For example, a voxel block from voxel group 402A would be ranked based on its determined Morton code in code ranking 410, and the texture chart that corresponds to the voxel block would be ranked in a respective position in the ranked texture charts 412.

The encoding computing system can determine a respective position in a texture atlas 404 for each texture chart 408 based at least in part on the rank of the Morton code for the corresponding voxel block in the code ranking 410. More particularly, the respective position of the texture charts in ranked texture charts 412 can correspond to the position of the respectively associated voxel blocks in the code ranking 410, and the ranked texture charts can be packed into the texture atlas 404 based on their rank. As an example, a Morton code (e.g., a code from Morton codes 406) can be generated for a voxel block of the block group 402A (e.g., a block with a relatively high z position integer towards the "head" of the person). The voxel block can be ranked in the code ranking 410 based on the relative location of the block (e.g., the x,y,z values of the block). The texture chart (e.g., of texture charts 408) associated with the voxel block can be ranked in the ranked texture charts 412 based on the voxel blocks code ranking in the code ranking 410. The ranked texture charts 412 can be, or otherwise describe, a respective position in a texture atlas for each of the texture charts.

Based on the texture atlas positions for each of the texture charts, the encoding computing system can generate a texture atlas that includes each of the plurality of texture charts. In such fashion, the initial spatio-temporal location of the voxel block (e.g., 402A) can correspond to the location of the texture chart (e.g., 404A) in the texture atlas 404. Similarly, blocks from different positions, such as block group 402B, can correspond to different locations in the texture atlas, such as positions 404B and 404C. In some implementations, the generation of the Morton code can be based on one spatial coordinate more than another spatial coordinate (e.g., favoring an x coordinate over a y coordinate). As depicted, the generated Morton codes for block group 402B can favor an x coordinate primarily, which is represented by the horizontal positioning variance between the texture charts at positions 404B and 404C. In such fashion, the 3D Morton code of the texture atlas 404 can use a ranking scheme to preserve the three-dimensionality of the packed texture charts, and can therefore be easily extracted back into a three-dimensional space by a decoder (e.g., by demultiplexing the bits of the Morton codes, etc.).

Figure 5:
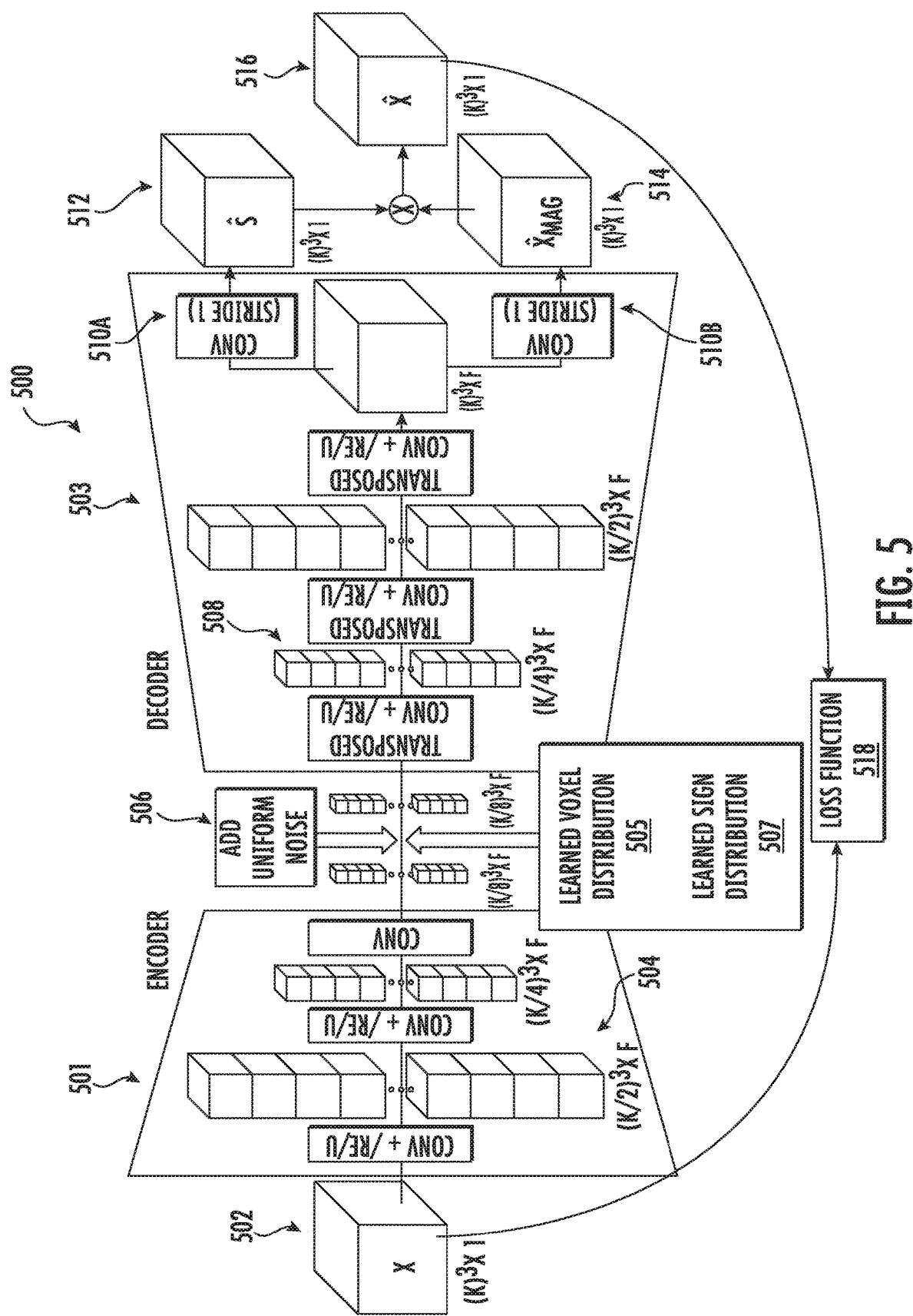
FIG. 5 depicts a block diagram of an example training architecture for training machine-learned models according to example embodiments of the present disclosure.

FIG. 5 depicts a block diagram of an example training architecture for training machine-learned models according to example embodiments of the present disclosure. It should be noted that although FIG. 5 depicts an end-to-end training of the model(s), the models do not necessarily need to be trained end-to-end. More particularly, the machine-learned encoder model 501, the machine-learned decoder model 503, the learned voxel distribution 505, and the learned sign distribution 507 of FIG. 5 can be trained end-to-end simultaneously, and after training, can be utilized as depicted in FIG. 3. A voxel block 502 can be input into the machine-learned encoding model 501. As depicted, the machine-learned encoding model 501 can include a number of convolutional layers (e.g., layer 504). However, it should be noted that any other sort of machine-learned model and/or machine-learned layer (e.g., neural networks, recurrent neural networks, LTSM (long-term short memory) layer(s), etc.) can be utilized.

The machine-learned encoding model 501 can generate an encoded voxel block (e.g., an encoded representation of voxel block 502). The encoded voxel block can, in some implementations, be a latent space representation of the voxel block 502. More particularly, given the voxel block 502 to be transmitted, a computing system can compute the lossy quantized latent representation $\hat{z}=[E(x; \theta_e]$ using the machine-learned encoding model 501 E with parameters $\theta_e$. The computing system can use $\hat{z}$ to compute the learned sign distribution 507 over the sign values of the voxels as $P_{s|\hat{z}}(s|\hat{z};\theta_s)$, where s is the ground truth sign configuration of voxel block 502, and $\theta_s$ are the learnable parameters of the learned sign distribution 505. In some implementations, the computing system can use an entropy encoder to compute the bitstreams $\hat{z}_{bits}$ and $s_{bit}$, by losslessly coding the latent code $\hat{z}$ and signs s of the voxel block 502 using the distributions $p_{\hat{z}}(\hat{z};\phi)$(e.g., the learned voxel distribution 505) and $p_{s|\hat{z}}(s|\hat{z};\theta_s)$ (e.g., the learned sign distribution 507) respectively. As an example, $p_{\hat{z}}(\hat{z};\phi)$ can be the learned voxel distribution over $\hat{z}$ parameterized by $\phi$.

Since the quantization operation of the inference step (e.g., 316 of FIG. 3, the entropy encoding and decoding of the latent space representation) is non-differentiable, quantization noise can be simulated during training rather than explicitly discretizing the output of the machine-learned encoding model 501. More particularly, the encoded voxel blocks can be quantized by rounding to the nearest integer $\hat{z}=Q(\varepsilon(x; \theta_e))=\lfloor\varepsilon(x; \theta_e)\rfloor$ which can be modeled by adding of uniform noise 506. Uniform noise 506 can be represented by $\hat{z}=\varepsilon(x; \theta_e)+\varepsilon, \varepsilon\sim\mathcal{U}[-0.5,0.5]$ to simulate quantization errors.

The encoded voxel blocks, alongside the uniform noise, can be received by the machine-learned decoding model 503. As depicted, the machine-learned decoding model 503 can include a number of convolutional layers (e.g., layer 508). However, it should be noted that any other sort of machine-learned model and/or machine-learned layer (e.g., neural networks, recurrent neural networks, LTSM (long-term short memory) layer(s), etc.) can be utilized. Further, as depicted, the machine-learned decoding model 503 can, in some implementations, utilize two convolutional heads (e.g., 510A and 510B). More particularly, in some implementations, the machine-learned decoding model 503 can be or otherwise include a convolutional neural network with a final convolutional layer including two convolutional heads 510A and 510B. The first convolutional head 510A and second convolutional head 510B can respectively generate the voxel block magnitudes 514 and the sign values 512, such that $p_x(s|\hat{z})=\mathcal{D}_s(\hat{z})$, and $\hat{x}=\text{sel}\mathcal{D}_b(\hat{z})|$. The voxel block magnitudes 512 and the sign values 514 can be decoded and/or summed to generate a reconstructed voxel block 516.

A loss function 518 can evaluate a difference between the reconstructed voxel block 516, or one or more components of the reconstructed voxel block 516 (e.g., the sign values 512 and/or magnitude values 514), and the voxel block 502. Based on the loss function 518, one or more parameters of the machine-learned encoding model 501, the machine-learned decoding model 503, the learned voxel distribution 505, and/or the learned sign distribution 507 can be adjusted. More particularly, in some implementations, the loss function 518 can evaluate a distortion, a latent bit rate, and a sign bit rate as described by $$\arg\min_\Theta \underbrace{D_{\hat{x}}(x, \hat{x}; \theta_e, \theta_d)}_{distortion} + \lambda\left[\underbrace{R_{\hat{z}}(\hat{z}; \phi)}_{latentsbitrate} + \underbrace{R_s(s; \theta_s)}_{signsbitrate}\right].$$

In some implementations, the distortion parameter $D_{\hat{x}}(x, \hat{x}; \theta_e, \theta_d)$ can evaluate a reconstruction error between the ground truth (e.g., the sign values of voxel block 502) and the predicted voxel values (e.g., predicted sign values 512 and magnitude values 514). A mask can be used to focus the training of the model(s) on more "relevant" voxels of the voxel block 502 (e.g., the voxels with a neighboring voxel of an opposing sign value). As an example, for each dimension, a mask can be created for important voxels of the voxel block 502, namely $m_x$, $m_y$ and $m_z$. Voxels that have more than one neighbor with opposing signs can appear in multiple masks, further increasing weights of these voxels. The masks can be used to calculate the squared differences for important voxels, as specified by $D\hat{x}=1/B \sum_{n=1}^{B}\sum_{d\in x,y,z}\|m_d\cdot(\hat{x}_n-x_n)\|_2^2$ for B blocks. In some implementations, the latent bit rate parameter $R_{\hat{z}}(\hat{z};\phi)$ can evaluate an estimate of the differential entropy of the noisy codes $z+\mathcal{U}[-0.5,0.5]$. As an example, the latent bit rate metric can provide an estimate of the entropy caused by the noise (e.g., as simulated by uniform noise 506) in the codes as coded by the entropy coder. In such fashion, the latent bit rate parameter can reduce the bit rate of the compressed codes, allowing for more efficient compression.

In some implementations, the signs bit rate parameter $R_s(s; \theta_s)$ can evaluate the rate of lossless compression of the sign values (e.g., sign values 512) for each of the plurality of voxels of the voxel block 502. Since S (e.g., the signs of the voxel block 502) contains only discrete values $\{-1,+1\}$, it can be compressed losslessly using entropy coding. As mentioned previously, the learned sign distribution $p_{s|\hat{z}}(s|\hat{z})$ 507 can be used instead of the prior distribution $p_s(s)$. It should be noted that, in some implementations, the learned sign distribution can have a much lower entropy than the priors, since s 512 is dependent on the $\hat{z}$ (e.g., latent space representation of voxel block 502) by design. This allows for more efficient compression of the sign values.

The sign rate loss $R_s$ can then be the cross entropy between the ground truth signs s, with −1 remapped to 0, and signs 512. In such fashion, minimizing the sign bit rate parameter $R_s(s; \theta_s)$ can train the model(s) (e.g. 501 and 503) and the distribution(s) (e.g., 505 and 507) to make more accurate sign predictions while also minimizing the bit rate of the compressed sign values.

Example Methods

Figure 6A:
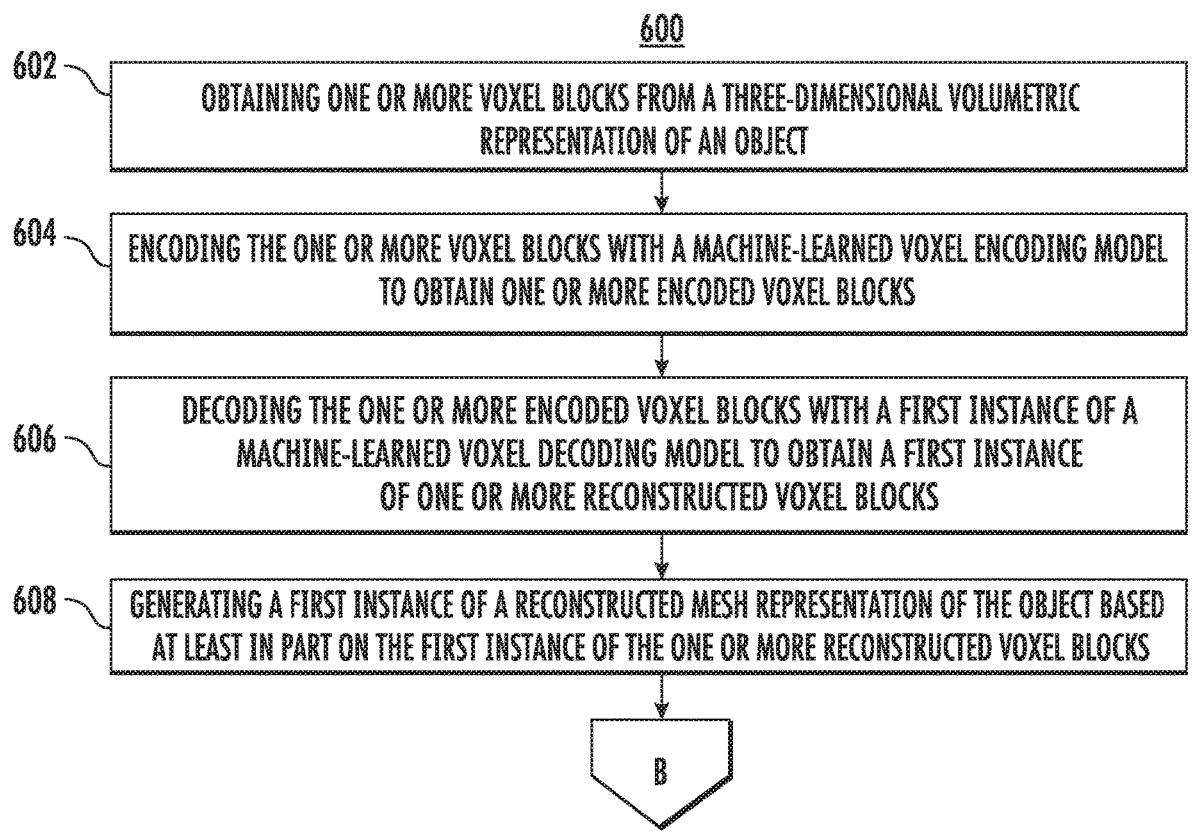
FIG. 6A depicts a flow chart diagram of an example method to perform encoding of three-dimensional volumetric representations according to example embodiments of the present disclosure.

FIG. 6A depicts a flow chart diagram of an example method to perform encoding of three-dimensional volumetric representations according to example embodiments of the present disclosure. Although FIG. 6A depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain one or more voxel blocks from a three-dimensional representation of an object. The three-dimensional volumetric representation can include a plurality of voxels and a respectively associated plurality of textures. Each of the plurality of voxels can include a magnitude value and a sign value. Each of the one or more voxel blocks can include a subset of the plurality of voxels.

In some implementations, the voxel blocks can include and/or be an implicit representation of a surface of the object represented by the volume (e.g., a signed distance field, a truncated signed distance field, etc.). As an example, each voxel can include a signed distance field that implicitly represents a distance from a surface (e.g., a magnitude) and a sign value associated with the voxels spatial location in regards to the surface. For example, a voxel located "inside" the surface of a volume can have a negative sign value while a voxel located "outside" the surface of a volume can have a positive sign value. For another example, a voxel that implicitly contains a surface can have sign and magnitude values of zero (e.g., a "zero crossing). In some implementations, the voxel can contain a truncated sign distance field. More particularly, the magnitude values of the voxels can be truncated at a certain threshold. For example, a voxel located relatively far from the surface of the volume may have a magnitude value of 15. If the magnitude truncation threshold was set to 1, the value of any magnitude more than 1 can be truncated to 1. In such fashion, the less "relevant" data (e.g., voxels far away from the surface of the volume) can be truncated, therefore allowing for more efficient representation of the volume surfaces.

In some implementations, the one or more voxel blocks can be obtained based at least in part on the sign values of the voxels. More particularly, the voxel blocks can have a size of k×k×k voxels (e.g., a three-dimensional block of voxels). Each of the one or more voxel blocks can, in some implementations, be a non-overlapping voxel block that contains a zero crossing (e.g., an occupied block). As an example, the plurality of voxels can be iterated through in a block-wise fashion (e.g., iterating k×k×k voxels at a time, etc.) to determine if a current block contains a voxel with a zero-crossing. If the block does contain the voxel, it can be extracted and encoded. If the block does not contain the voxel, the block can be skipped for encoding. In such fashion, the computing system can extract and encode the blocks that are relevant to the surface of the object while passing over less relevant blocks, therefore substantially reducing the number of voxel blocks that are encoded and transmitted. It should be noted that, in some implementations, the size of an object and/or the volumetric size of the block may require that only one block is selected from the plurality of voxels (e.g., all of the voxels with zero crossings are contained in one block, etc.).

In some implementations, the voxel blocks can be indexed in a voxel block index. The voxel block index can store the spatial location of the voxel blocks after they are extracted. It should be noted that the extraction of voxel blocks containing a zero crossing can, in some implementations, increase the importance of maintaining spatial coherency between the extracted blocks to properly reconstruct the surface of the volume. As such, the voxel block index can be used to reconstruct the voxel blocks at their original spatial locations by a separate computing system (e.g., a decoding computing system, etc.).

At 604, the computing system can encode the one or more voxel blocks with a machine-learned voxel encoding model to obtain one or more encoded voxel blocks. More particularly, given a block x to be transmitted, the computing system (e.g., the sending/transmitting computing system, etc.) can compute the lossy quantized latent representation $\hat{z}=[E(x; \theta_e]$ using the machine-learned encoding model E with parameters $\theta_e$. The computing system can use $\hat{z}$ to compute the conditional probability distribution over the sign values of the voxels as $p_{s|\hat{z}}(s|\hat{z};\theta_s)$, where s is the ground truth sign configuration of the block, and $\theta_s$ are the learnable parameters of the learned sign distribution. In some implementations, the computing system can use an entropy encoder to compute the bitstreams $\hat{z}_{bits}$ and $s_{bits}$ by losslessly coding the latent code $\hat{z}$ and signs s using the distributions $p_{\hat{z}}(\hat{z};\phi)$ and $p_{s|\hat{z}}(s|\hat{z};\theta_s)$ respectively. As an example, $p_{\hat{z}}(\hat{z};\phi)$ can be a prior learned voxel distribution over $\hat{z}$ parameterized by $\phi$. It should be noted that, in some implementations, the prior learned voxel distributions and learned sign distributions can be trained prior in a training phase, as will be discussed in greater detail with regards to the figures.

At 606, the computing system can decode the one or more encoded voxel blocks with a first instance of a machine-learned voxel decoding model (e.g., a trained convolutional neural network, recurrent neural network, etc.) to obtain a first instance of one or more reconstructed voxel blocks. The reconstructed voxel block(s) can be a lossy reconstruction of the one or more voxel blocks. In some implementations, the reconstructed voxel blocks can be reconstructed based at least in part on the voxel index that describes a spatial location of the one or more voxel blocks.

At 608, the computing system can generate a first instance of a reconstructed mesh representation of the object based at least in part on the first instance of the one or more reconstructed voxel blocks. The reconstructed mesh (e.g., a triangle mesh, etc.) can be a polygonal mesh representation of the surface of the object in the volume. The reconstructed mesh representation can, in some implementations, contain the associated plurality of textures of the three-dimensional volumetric representation. As an example, the reconstructed mesh representation can be a textured mesh representation. Alternatively, in some implementations, the reconstructed mesh representation can be reconstructed separately from the plurality of textures.

At 610, the computing system can encode the plurality of textures according to an encoding scheme to obtain a plurality of encoded textures. In some implementations, the encoding can be based at least in part on the first instance of the reconstructed mesh representation of the object. More particularly, the encoding scheme can be a tracking-free UV parametrization method that can be combined with the block-level geometric encoding of the one or more voxel blocks. In some implementations, the polygons of each voxel block can be extracted and grouped based at least in part on one or more characteristics of the polygons (e.g., the normals of the polygons, texture properties associated with the textures of the polygons, etc.). As an example, the polygons of one voxel block can be grouped in one group. As another example, the polygons of one voxel block can be mapped to multiple groups.

Figure 6B:
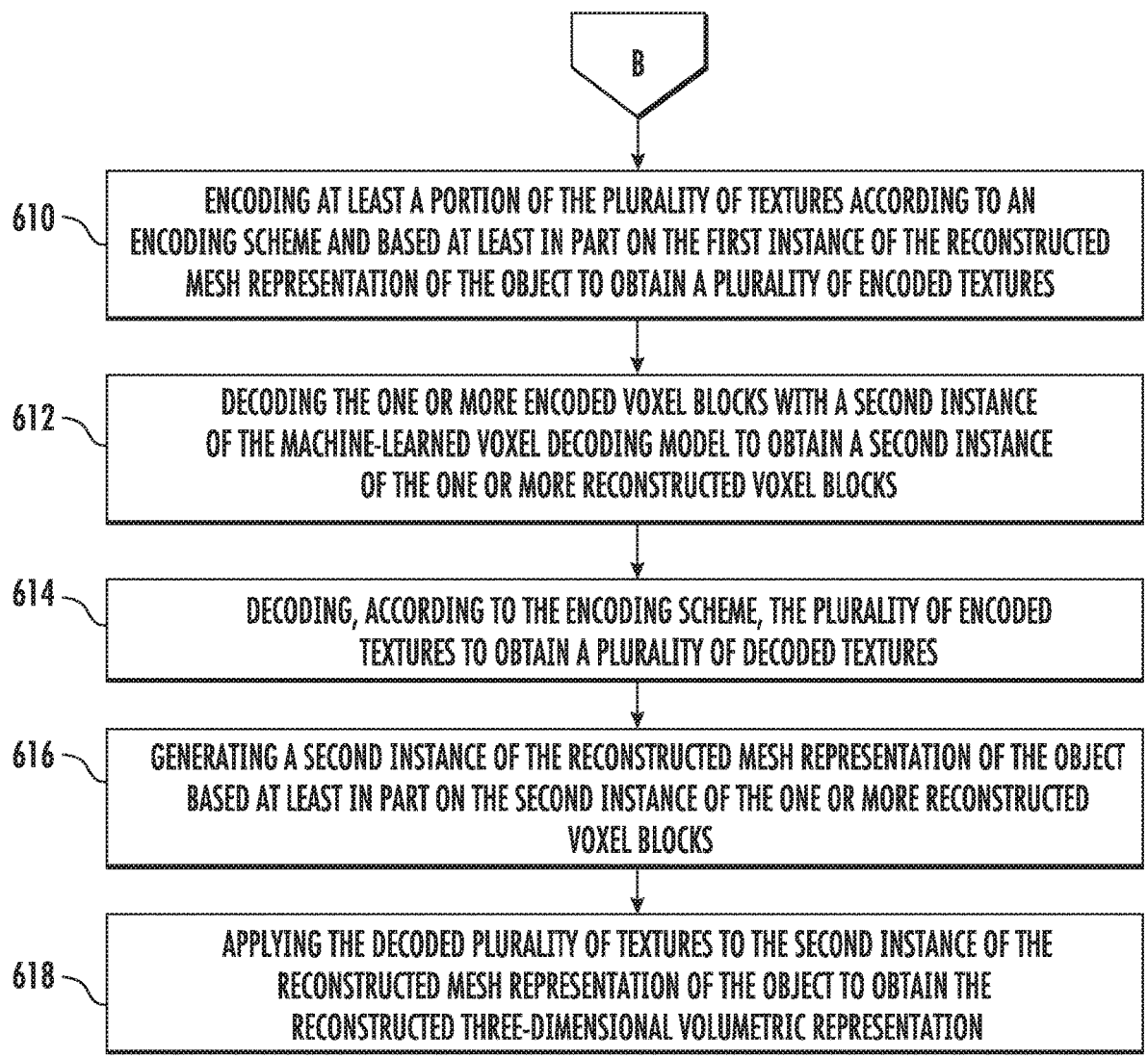
FIG. 6B depicts a flow chart diagram of an example method to perform decoding of three-dimensional volumetric representations according to example embodiments of the present disclosure.

FIG. 6B depicts a flow chart diagram of an example method to perform decoding of three-dimensional volumetric representations according to example embodiments of the present disclosure. Although FIG. 6B depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure. Further, although FIG. 6B is depicted as a continuation of the method of FIG. 6A, it should be noted that the steps of FIG. 6B can be performed separately and independently of the steps of FIG. 6A.

At 612, a computing system can receive the encoded voxel block(s) and decode the encoded voxel block(s) with a second instance of the machine-learned voxel decoding model to obtain a second instance of the one or more reconstructed voxel blocks. The computing system of step 612 and the subsequent steps (e.g., steps 614-618) can, in some implementations, be a computing system that is different than the computing system of steps 602-610. Alternatively, in some implementations, the computing system of steps 612-618 can be the same computing system and the computing system of steps 602-610. It should be noted that the machine-learned voxel decoding model can be a pre-trained, deterministic model. As such, the outputs of the first instance of the machine-learned voxel decoding model (e.g., on an encoding computing system) and the second instance of the model (e.g., on a decoding computing system) can produce identical, deterministic outputs given the same input. As such, the first instance of the reconstructed blocks on the computing system will be the same as or substantially similar to the second instance of the reconstructed blocks on a separate computing system (e.g., due to transmission loss, etc.). In such fashion, the textures encoded based on the first instance of the reconstructed blocks will be more compatible with the second instance of the reconstructed blocks (e.g., for application to the blocks and/or a product of the blocks, etc.).

At 614, the computing system can decode the received encoded textures to obtain a plurality of decoded textures. The textures can be decoded according to the previously utilized encoding scheme. More particularly, the bits of the texture atlas (e.g., the Morton codes) containing the textures can be demultiplexed and used to decode the textures in a manner that maintains the spatial coherence of the textures At 616, the computing system can generate a second instance of the reconstructed mesh representation based at least in part on the second instance of the one or more reconstructed voxel blocks. The reconstructed mesh representation can be generated in the same fashion as the first instance of the reconstructed mesh representation (e.g., using a marching cubes algorithm with the reconstructed voxel blocks, etc.). It should be noted that the second instance of the reconstructed mesh representation can be identical or substantially similar to the first instance.

At 618, the computing system can apply to the second instance of the one or more reconstructed voxel blocks to obtain a reconstructed three-dimensional volumetric representation of the object. The plurality of decoded textures can, in some implementations, be applied to the reconstructed mesh representation (e.g., a polygonal mesh, etc.) in the manner specified by the demultiplex Morton codes of the texture atlas. Since the plurality of decoded textures are packed into the texture atlas in a manner that maintains spatial and positional coherence, the textures can easily be unpacked and iteratively applied to the mesh in the same order they were extracted.

Figure 7:
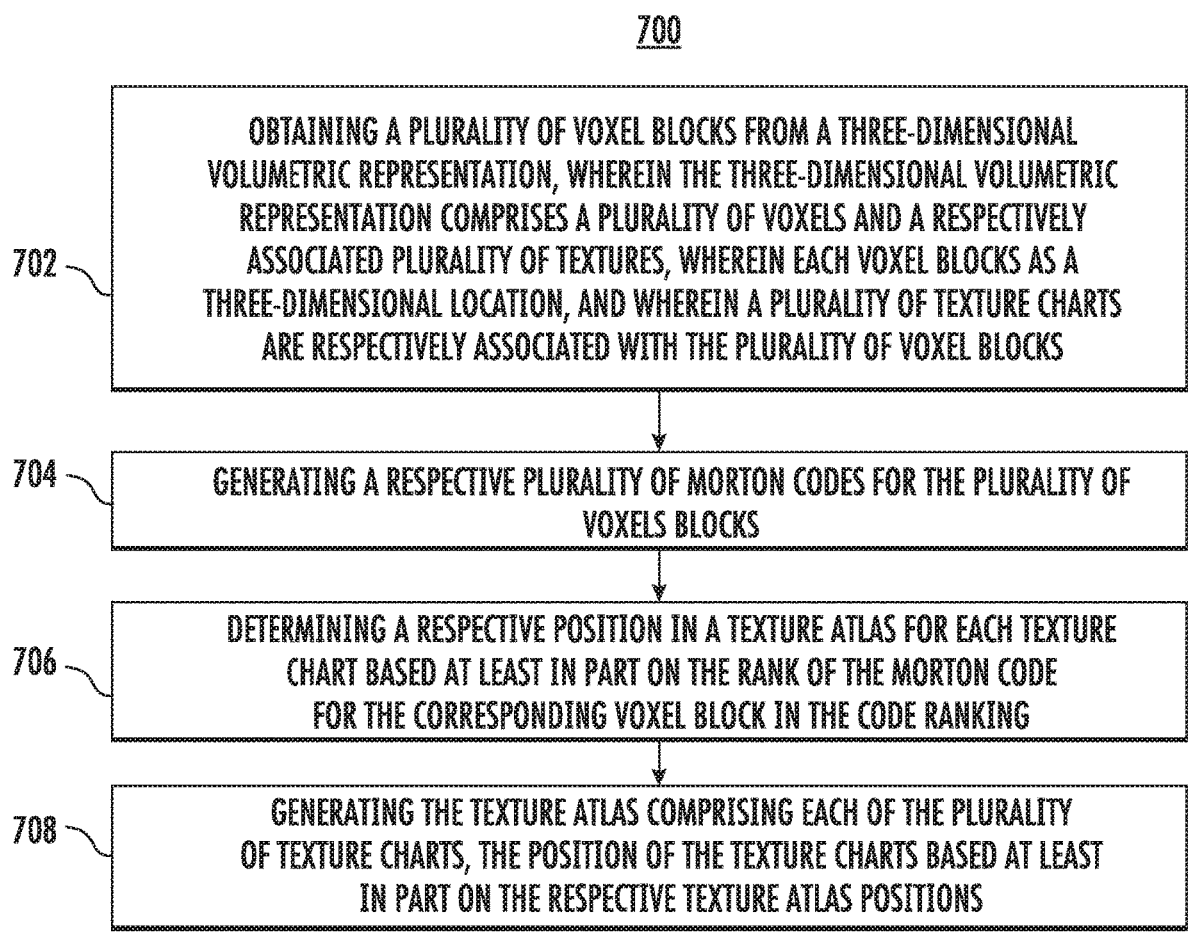
FIG. 7 depicts a flow chart diagram of an example method to perform encoding of a plurality of textures associated with the geometry of a three-dimensional volumetric representation according to example embodiments of the present disclosure.

FIG. 7 depicts a flow chart diagram of an example method to perform decoding of three-dimensional volumetric representations according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 700, a computing system can obtain a plurality of voxel blocks from a three-dimensional volumetric representation. The one or more voxel blocks can, in some implementations, be obtained based at least in part on the sign values of the voxels. More particularly, the voxel blocks can have a size of k×k×k voxels (e.g., a three-dimensional block of voxels). Each of the one or more voxel blocks can, in some implementations, be a non-overlapping voxel block that contains a zero crossing (e.g., an occupied block). As an example, the plurality of voxels can be iterated through in a block-wise fashion (e.g., iterating k×k×k voxels at a time, etc.) to determine if a current block contains a voxel with a zero-crossing. If the block does contain the voxel, it can be selected. If the block does not contain the voxel, the block can be skipped. In such fashion, the voxel blocks can be selected that are relevant to the surface of an object in the three-dimensional volumetric representation while passing over less relevant blocks, therefore substantially reducing the number of voxel blocks that are used.

The three-dimensional volumetric representation can include a plurality of voxels and a respectively associated plurality of textures. Each voxel block can have a three-dimensional location. As an example, the three-dimensional location (e.g., as integer x,y,z coordinates, etc.) of a voxel block from a first block group (e.g., around the head level of a person) can have a higher z coordinate relative to a voxel block from a second block group (e.g., around the foot level of a person).

A plurality of texture charts can be respectively associated with the plurality of voxel blocks. In some implementations, the plurality of texture charts can be respectively extracted from each of the voxel blocks. As an example, for each block, the textures (e.g., polygons, triangles, etc.) in the block can be extracted and grouped by their normals. Most blocks have only one group, while blocks in more complex areas (e.g. the fingers of a person) may have more than one respectively associated group. The vertices of the textures (e.g., polygons, etc.) in each texture chart can be mapped to UV space as follows: (1) the average normal in the group is used to determine a tangent space, onto which the vertices in the group are projected. (2) The projections are rotated until they fit into an axis-aligned rectangle with minimum area, using rotating calipers. It should be noted that, in some implementations, this can result in deterministic UV coordinates for each vertex in the group relative to a bounding box for the vertex projections. (3) The bounding boxes for the group(s) respectively associated with the voxel block are then sorted by size and packed into a texture chart using a quadtree-like algorithm. In some implementations, there can be one 2D chart for each voxel block. The UV coordinates for the vertices in the block can be offset to be relative to the texture chart.

At 704, the computing system can generate a respective plurality of Morton codes for the plurality of voxel blocks.

The Morton codes can be based on the three-dimensional location (e.g., as integer x,y,z coordinates, etc.). More particularly, the binary representation of the integers that index the spatial location of the voxel blocks (e.g., the x,y,z coordinates) can be converted to a representational Morton code (e.g., a 2D Morton code, a 3D Morton code, etc.). As an example, the triple of integers describing a three-dimensional spatial location of a voxel block can be converted to a 2D Morton code. For example, each texture chart can be indexed by a pair of integers $(u, v) \in \mathbb{Z}^2$, whose 2D Morton code is the integer $M_2(u, v) = \Sigma_{b=0}^{B-1}(2u_b + v_b)2^{2b}$ whose binary representation is $u_{B-1}v_{B-1} \ldots u_0v_0$. Conversion in this manner can provide compatibility with the two-dimensional regular grid structure of a texture atlas (e.g., converting x,y,z variables to u,v variables, etc.).

At 706, the computing system can determine a respective position in a texture atlas for each texture chart based at least in part on the rank of the Morton code for the corresponding voxel block in the code ranking. More particularly, a three-dimensional Morton code can be generated for the texture atlas that includes and ranks the Morton codes of the texture atlas. The texture charts can be mapped to the voxel blocks at volumetric position (x, y, z) to texture atlas position $(u, v) = M_2^{-1}(\text{rank}(M_3(x, y, z)))$, where rank is the rank of the 3D Morton code in the list of 3D Morton codes. As an example, the ranked Morton codes of the voxel blocks can be used to rank their corresponding texture charts. For example, a voxel block from a first voxel group can be ranked based on its determined Morton code in the code ranking, and the texture chart that corresponds to the voxel block can have a determined position in the texture atlas that corresponds to the rank of the voxel block in the code ranking.

At 708, the computing system can generate the texture atlas. The texture atlas can include each of the plurality of texture charts. The position of the texture charts in the texture atlas can be based at least in part on the respectively determined texture atlas positions. The charts for the blocks can then be packed into the atlas. After the chart packing, the UV coordinates for the vertices can again be offset to be relative to the texture atlas (e.g., to be or otherwise include a global UV mapping, etc.). After UV parametrization, color information can be obtained from either per-vertex color in the geometry, previously generated atlas or even raw RGB captures. In such fashion, the initial spatio-temporal location of the voxel blocks can correspond to the locations of the texture charts in the texture atlas. Similarly, blocks from different positions can correspond to different locations in the texture atlas. In some implementations, the generation of the Morton code(s) can be based on one spatial coordinate more than another spatial coordinate (e.g., favoring an x coordinate over a y coordinate, etc.). In such fashion, the 3D Morton code of the texture atlas can use a ranking scheme to preserve the three-dimensionality of the packed texture charts, and can therefore be easily extracted back into a three-dimensional space by a decoder (e.g., by demultiplexing the bits of the Morton codes, etc.).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform compression of three-dimensional volumetric representations, the method comprising:

obtaining, by an encoding computing system comprising one or more computing devices, one or more voxel blocks from a three-dimensional volumetric representation of an object, wherein the three-dimensional volumetric representation comprises a plurality of voxels and a respectively associated plurality of textures, wherein each of the plurality of voxels comprises a magnitude value and a sign value, and wherein each of the one or more voxel blocks comprising a subset of the plurality of voxels;

encoding, by the encoding computing system, the one or more voxel blocks with a machine-learned voxel encoding model to obtain one or more encoded voxel blocks;

decoding, by the encoding computing system, the one or more encoded voxel blocks with a first instance of a machine-learned voxel decoding model to obtain a first instance of one or more reconstructed voxel blocks;

generating, by the encoding computing system, a first instance of a reconstructed mesh representation of the object based at least in part on the first instance of the one or more reconstructed voxel blocks;

encoding, by the encoding computing system, at least a portion of the plurality of textures according to an encoding scheme, wherein each texture of the at least the portion of the plurality of textures is encoded based at least in part on a spatial position of each of the one or more reconstructed voxel blocks in three-dimensional space to obtain a plurality of encoded textures;

encoding, by the encoding computing system and using an entropy encoder, the one or more encoded voxel blocks to obtain one or more entropy encoded voxel blocks; and transmitting, by the encoding computing system, the one or more entropy encoded voxel blocks, a voxel block index, and the plurality of encoded textures to a decoding computing system that is remotely located from the encoding computing system, wherein the voxel block index describes the spatial position of each of the one or more reconstructed voxel blocks in three-dimensional space.

2. The computer-implemented method of claim 1, further comprising:
    decoding, by a decoding computing system, the one or more encoded voxel blocks with a second instance of the machine-learned voxel decoding model to obtain a second instance of the one or more reconstructed voxel blocks;
    decoding, by the decoding computing system according to the encoding scheme, the plurality of encoded textures to obtain a plurality of decoded textures; and
    applying, by the decoding computing system, the plurality of decoded textures to the second instance of the one or more reconstructed voxel blocks to obtain a reconstructed three-dimensional volumetric representation of the object.

3. The computer-implemented method of claim 2, wherein applying, by the decoding computing system, the plurality of decoded textures to the second instance of the one or more reconstructed voxel blocks to obtain the reconstructed three-dimensional volumetric representation of the object comprises:
    generating, by the decoding computing system, a second instance of the reconstructed mesh representation of the object based at least in part on the second instance of the one or more reconstructed voxel blocks; and
    applying, by the decoding computing system, the decoded plurality of textures to the second instance of the reconstructed mesh representation of the object to obtain the reconstructed three-dimensional volumetric representation.

4. The computer-implemented method of claim 3, wherein the instances of the one or more reconstructed voxel blocks are obtained based at least in part on the voxel block index.

5. The computer-implemented method of claim 1, wherein each voxel comprises a truncated signed distance field.

6. The computer-implemented method of claim 1, wherein encoding, by the encoding computing system, the one or more voxel blocks with the machine-learned voxel encoding model to obtain the one or more encoded voxel blocks further comprises encoding, by the encoding computing system, the sign values of the one or more voxel blocks with the machine-learned voxel encoding model to obtain encoded sign values respectively associated with the one or more encoded voxel blocks, the encoded sign values based on a learned sign distribution, the learned sign distribution conditioned on the one or more encoded voxel blocks.

7. The computer-implemented method of claim 1, wherein:
    encoding, by the encoding computing system and using the entropy encoder, the one or more encoded voxel blocks to obtain the one or more entropy encoded voxel blocks further comprises encoding, by the encoding computing system and using the entropy encoder, the one or more encoded sign values to obtain entropy encoded sign values; and
    transmitting, by the encoding computing system, the one or more entropy encoded voxel blocks, to the decoding computing system further comprises transmitting, by the encoding computing system, the entropy encoded sign values to the decoding computing system.

8. The computer-implemented method of claim 6, wherein a decoding computing system decodes the one or more encoded voxel blocks and the one or more encoded sign values with a second instance of the machine-learned voxel decoding model to obtain the second instance of the one or more reconstructed voxel blocks.

9. The computer-implemented method of claim 7, wherein the entropy encoded sign values comprise a lossless encoding of the sign values of the plurality of voxels.

10. The computer-implemented method of claim 6, wherein:
    the one or more encoded voxel blocks are encoded based at least in part on a learned voxel distribution;
    at least one of the learned voxel distribution, the learned sign distribution, the machine-learned voxel encoding model, or the machine-learned voxel decoding model are trained on a loss function; and
    the loss function evaluates a difference between the three-dimensional volumetric representation and the reconstructed three-dimensional volumetric representation.

11. The computer-implemented method of claim 1, wherein encoding, by the encoding computing system, at least the portion of the plurality of textures according to the encoding scheme and based at least in part on the first instance of the reconstructed mesh representation of the object to obtain the plurality of encoded textures comprises:
    extracting, by the encoding computing system, a plurality of polygons from the reconstructed mesh representation;
    grouping, by the encoding computing system, the plurality of polygons into one or more polygon groups based at least in part on one or more polygon characteristics of each of the plurality of polygons;
    generating, by the encoding computing system, a polygon chart comprising the one or more polygon groups, the polygon chart configured to maintain spatial coherence between each of the one or more polygon groups; and
    mapping, by the encoding computing system, each of the one or more polygon charts to a texture atlas, wherein the spatial location of the one or more polygon charts in the texture atlas corresponds to the spatial location of each of the one or more reconstructed voxel blocks in three-dimensional space.

12. A computing system comprising:
    one or more processors; and
    one or more non-transitory computer-readable media that collectively store a first set of instructions that, when executed by the one or more processors, cause the computing system to perform operations, the operations comprising:
        obtaining one or more voxel blocks from a three-dimensional volumetric representation of an object, wherein the three-dimensional volumetric representation comprises a plurality of voxels and a respectively associated plurality of textures, wherein each of the plurality of voxels comprises a magnitude value and a sign value, and wherein each of the one or more voxel blocks comprises a subset of the plurality of voxels;
        encoding the one or more voxel blocks with a machine-learned voxel encoding model to obtain one or more encoded voxel blocks and encoded sign values respectively associated with the one or more encoded voxel blocks, the one or more encoded voxel blocks based at least in part on a learned voxel distribution, the encoded sign values based at least in part on a learned sign distribution conditioned on the one or more encoded voxel blocks;

decoding the one or more encoded voxel blocks with a machine-learned voxel decoding model to obtain one or more reconstructed voxel blocks;

decoding the encoded sign values with the machine-learned voxel decoding model to obtain decoded sign values respectively associated with the one or more reconstructed voxel blocks, wherein the machine-learned voxel decoding model comprises a convolutional neural network with a final convolutional layer, the final convolutional layer comprising two convolutional heads, a first convolutional head of the two convolutional heads configured to generate the one or more reconstructed voxel blocks and a second convolutional head of the two convolutional heads configured to generate the decoded sign values; and evaluating a loss function that evaluates a difference between the one or more voxel blocks and the one or more reconstructed voxel blocks.

13. The computing system of claim 12, wherein the operations further comprise adjusting, based at least in part on the loss function, one or more parameters of at least one of:
the machine-learned voxel encoding model;
the machine-learned voxel decoding model;
the learned voxel distribution; or
the learned sign distribution.

14. The computing system of claim 12, wherein the loss function evaluates a difference between a subset of voxels in each of the one or more voxel blocks and the one or more reconstructed voxel blocks, the subset specified by a mask based at least in part on the sign values of each voxel of the subset of voxels.

15. The computing system of claim 12, wherein the loss function further evaluates a difference between the decoded sign values and the sign values of the plurality of voxels of the three-dimensional volumetric representation.

16. The computing system of claim 12, wherein uniform noise is added to the machine-learned voxel encoding model during encoding.

17. The computing system of claim 12, wherein the loss function further evaluates a size of the one or more encoded voxel blocks.

18. A computer-implemented method to perform compression of textures associated with three-dimensional volumetric representations, the method comprising:

obtaining, by an encoding computing system comprising one or more computing devices, a plurality of voxel blocks from a three-dimensional volumetric representation, wherein the three-dimensional volumetric representation comprises a plurality of voxels and a respectively associated plurality of textures, wherein each voxel block has a three-dimensional location, and wherein a plurality of texture charts are respectively associated with the plurality of voxel blocks;

generating, by the encoding computing system, a respective plurality of Morton codes for the plurality of voxel blocks;

determining, by the encoding computing system, a code ranking that ranks each of the plurality of Morton codes;

determining, by the encoding computing system, a respective position in a texture atlas for each texture chart based at least in part on the rank of the Morton code for the corresponding voxel block in the code ranking;

generating, by the encoding computing system, the texture atlas comprising each of the plurality of texture charts, the position of the texture charts based at least in part on the respective texture atlas positions;

encoding, by the encoding computing system, the one or more voxel blocks with a machine-learned voxel encoding model to obtain one or more encoded voxel blocks;

encoding, by the encoding computing system and using an entropy encoder, the one or more encoded voxel blocks to obtain one or more entropy encoded voxel blocks; and transmitting, by the encoding computing system, the one or more entropy encoded voxel blocks, a voxel block index, and the texture atlas to a decoding computing system that is remotely located from the encoding computing system, wherein the voxel block index describes a spatial position of each of the one or more voxel blocks in three-dimensional space.

19. The computer-implemented method of claim 18, wherein each of the positions of the texture charts is described by a Morton code.

20. The computer-implemented method of claim 18, wherein generating, by the computing system, the respective plurality of Morton codes for the plurality of voxel blocks comprises converting, by the computing system, two-dimensional coordinates for each of the plurality of voxel blocks to corresponding Morton codes.

21. A computer-implemented method to perform decompression of a three-dimensional volumetric representation, the method comprising:

receiving, by a decoding computing system comprising one or more computing devices, one or more encoded voxel blocks corresponding to the three-dimensional volumetric representation, a voxel block index, and a respectively associated plurality of encoded textures, wherein the plurality of encoded textures were encoded based at least in part on a reconstructed mesh representation generated from one or more reconstructed voxel blocks produced by a first instance of a machine-learned voxel decoding model at an encoding computing system, wherein the one or more encoded voxel blocks are entropy encoded by the encoding computing system, and wherein the voxel block index describes a spatial position of each of the one or more reconstructed voxel blocks in three-dimensional space;

decoding, by the decoding computing system, the one or more encoded voxel blocks with a second instance of the machine-learned voxel decoding model based on the voxel block index to obtain the one or more reconstructed voxel blocks;

decoding, by the decoding computing system according to an encoding scheme, the plurality of encoded textures to obtain a plurality of decoded textures, wherein the plurality of encoded textures were encoded at the different computing system according to the encoding scheme and based on the spatial position of each of the one or more reconstructed voxel blocks in three-dimensional space;

generating, by the decoding computing system, the reconstructed mesh representation based at least in part on the one or more reconstructed voxel blocks; and applying, by the decoding computing system, the decoded plurality of textures to the reconstructed mesh representation to obtain a reconstruction of the three-dimensional volumetric representation.

* * * * *